United States Patent
Whang et al.

(10) Patent No.: US 11,128,908 B2
(45) Date of Patent: Sep. 21, 2021

(54) ELECTRONIC DEVICE AND METHOD FOR CONTROLLING THE SAME

(71) Applicant: SAMSUNG ELECTRONICS CO., LTD., Suwon-si (KR)

(72) Inventors: Soo-hyun Whang, Seoul (KR); Ha-na Kim, Suwon-si (KR); Jun-yong Park, Suwon-si (KR); Jee-hoon Park, Seoul (KR); Hyun-yong Choi, Suwon-si (KR); You-na Choo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

(21) Appl. No.: 15/675,119

(22) Filed: Aug. 11, 2017

(65) Prior Publication Data

US 2018/0115734 A1    Apr. 26, 2018

(30) Foreign Application Priority Data

Oct. 25, 2016 (KR) .................. 10-2016-0139096

(51) Int. Cl.
*H04N 21/422* (2011.01)
*H04N 5/44* (2011.01)
(Continued)

(52) U.S. Cl.
CPC ......... *H04N 21/42204* (2013.01); *G06T 7/11* (2017.01); *G06T 7/194* (2017.01);
(Continued)

(58) Field of Classification Search
CPC ......... H04N 5/4403; G06T 7/194; G06T 7/11; G06T 7/337
(Continued)

(56) References Cited

U.S. PATENT DOCUMENTS 8,547,467 B2   10/2013   Kouda et al.
8,599,313 B2 *  12/2013   Barenbrug ......... H04N 5/44591
                                                         348/563
(Continued)

FOREIGN PATENT DOCUMENTS

CN   102547092 A   7/2012
CN   103034373 A   4/2013
(Continued)

OTHER PUBLICATIONS

International Search Report dated Jan. 15, 2018, issued by International Searching Authority in counterpart International Application No. PCT/KR2017/011218 (PCT/ISA/210).
(Continued)

*Primary Examiner* — John W Miller
*Assistant Examiner* — Sean N. Haiem
(74) *Attorney, Agent, or Firm* — Sughrue Mion, PLLC

(57) ABSTRACT

An electronic device that is interlocked with a display device and a method for controlling the electronic device are provided. The method includes acquiring an image by photographing an area in which the display device is installed, identifying a display area in which the display device is disposed and a background area of the display device by analyzing the acquired image, acquiring information that relates to a background image of a position at which the display device is installed based on the identified background area, and transmitting the acquired background image information to the display device.

15 Claims, 25 Drawing Sheets

(51) Int. Cl.
| | |
|---|---|
| *H04N 21/47* | (2011.01) |
| *G06T 7/194* | (2017.01) |
| *G06T 7/11* | (2017.01) |
| *G06T 7/33* | (2017.01) |
| *H04N 21/478* | (2011.01) |
| *H04N 21/41* | (2011.01) |

(52) U.S. Cl.
CPC ........... *G06T 7/337* (2017.01); *H04N 5/4448* (2013.01); *H04N 21/47* (2013.01); *G06T 2207/10024* (2013.01); *G06T 2207/30208* (2013.01); *H04N 21/41265* (2020.08); *H04N 21/478* (2013.01)

(58) Field of Classification Search
USPC .......... 345/633, 419; 348/734, 61, 121, 563; 382/103
See application file for complete search history.

(56) References Cited

U.S. PATENT DOCUMENTS

| | | | |
|---|---|---|---|
| 8,629,929 B2 | 1/2014 | Kouda et al. | |
| 8,698,899 B2 | 4/2014 | Nakamura et al. | |
| 8,731,301 B1* | 5/2014 | Bushman | G06K 9/2063 235/375 |
| 9,330,479 B2 | 5/2016 | Suzuki | |
| 9,575,630 B2 | 2/2017 | Kouda et al. | |
| 9,633,478 B2 | 4/2017 | Kim et al. | |
| 10,120,535 B2 | 11/2018 | Kouda et al. | |
| 2002/0057280 A1* | 5/2002 | Anabuki | G02B 27/017 345/633 |
| 2008/0056569 A1* | 3/2008 | Williams | G06T 5/50 382/173 |
| 2009/0225196 A1* | 9/2009 | Bell | G06T 7/11 348/239 |
| 2009/0295711 A1 | 12/2009 | Nakamura et al. | |
| 2010/0195912 A1 | 8/2010 | Nakada et al. | |
| 2010/0201878 A1* | 8/2010 | Barenbrug | H04N 21/4318 348/563 |
| 2012/0013646 A1* | 1/2012 | Ichioka | G09G 5/00 345/690 |
| 2012/0017236 A1* | 1/2012 | Stafford | A63F 13/00 725/32 |
| 2012/0056873 A1* | 3/2012 | Kim | H04N 13/261 345/419 |
| 2012/0075440 A1* | 3/2012 | Ahuja | G06T 7/11 348/61 |
| 2012/0147242 A1 | 6/2012 | Kouda et al. | |
| 2013/0050076 A1* | 2/2013 | Hong | G06F 3/017 345/157 |
| 2013/0174035 A1 | 7/2013 | Grab | |
| 2013/0293757 A1 | 11/2013 | Kouda et al. | |
| 2014/0082564 A1 | 3/2014 | Kouda et al. | |
| 2014/0226900 A1* | 8/2014 | Saban | G02B 5/08 382/165 |
| 2014/0307084 A1* | 10/2014 | Zontrop | H04N 1/00129 348/121 |
| 2014/0313117 A1 | 10/2014 | Addy et al. | |
| 2015/0138225 A1* | 5/2015 | Minato | G06T 11/60 345/593 |
| 2015/0163345 A1* | 6/2015 | Cornaby | G06F 3/04847 345/633 |
| 2015/0238073 A1* | 8/2015 | Charles | A61B 17/02 600/102 |
| 2015/0254868 A1* | 9/2015 | Srikanth | G06T 7/0081 348/47 |
| 2015/0286873 A1* | 10/2015 | Davis | G06F 3/00 382/103 |
| 2016/0012641 A1* | 1/2016 | Kim | G06T 19/006 345/633 |
| 2016/0198099 A1 | 7/2016 | Han et al. | |
| 2016/0219281 A1* | 7/2016 | Yoshikawa | H04N 19/167 |
| 2017/0046047 A1 | 2/2017 | Kouda et al. | |
| 2017/0098332 A1* | 4/2017 | Knight | G06T 19/006 |
| 2017/0200279 A1* | 7/2017 | Zhong | G06T 7/11 |

FOREIGN PATENT DOCUMENTS

| | | |
|---|---|---|
| CN | 106303250 A | 1/2017 |
| EP | 2570986 A1 | 3/2013 |
| JP | 2006-189708 A | 7/2006 |
| JP | 2008-249952 A | 10/2008 |
| JP | 2009-284276 A | 12/2009 |
| JP | 2013168922 A | 8/2013 |
| JP | 2013172307 A | 9/2013 |
| KR | 1020050030254 A | 3/2005 |
| KR | 10-2014-0060365 A | 5/2014 |
| KR | 1020160005957 A | 1/2016 |
| WO | 2006/112308 A1 | 10/2006 |
| WO | 2010/024000 A1 | 3/2010 |
| WO | 2013037617 A1 | 3/2013 |
| WO | 2014/047131 A1 | 3/2014 |
| WO | 2016/124146 A1 | 8/2016 |

OTHER PUBLICATIONS

Written Opinion dated Jan. 15, 2018, issued by International Searching Authority in counterpart International Application No. PCT/KR2017/011218 (PCT/ISA/237).
Photoxels., "Tutorial: Create a Transparent Screen Trick Photo", https://www.photoxels.com/create-a-transparent-screen-trick-photo/, Aug. 8, 2010 (19 Pages total).
Communication dated Mar. 8, 2018, issued by the European Patent Office in counterpart European Application No. 17185518.2.
Communication dated May 21, 2020 issued by the Korean Intellectual Property Office in counterpart Korean Application No. 10-2016-0139096.
Communication dated May 26, 2020 issued by the Japanese Patent Office in counterpart Japanese Application No. 2019-517398.
Communication dated Jul. 29, 2020 issued by the State Intellectual Property Office of P.R. China in counterpart Chinese Application No. 201711000065.6.
Communication dated Oct. 29, 2020, issued by the Korean Intellectual Property Office in Korean Patent Application No. 10-2016-0139096.
Communication dated Dec. 29, 2020, issued by the Indian Patent Office in Indian Patent Application No. 201947008353.

* cited by examiner

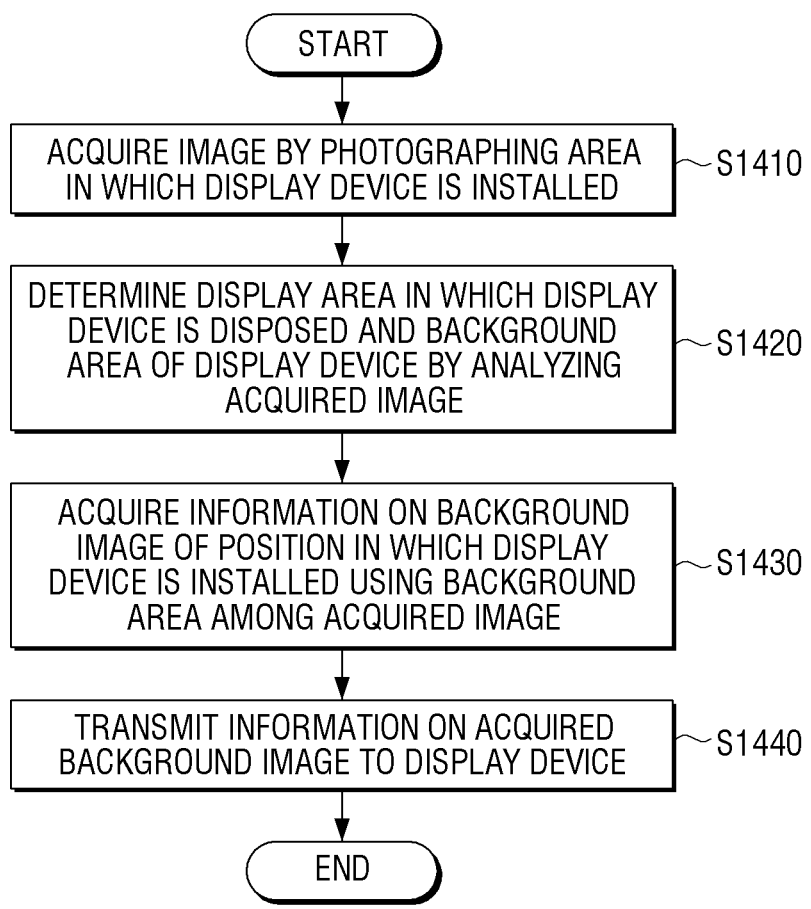

ELECTRONIC DEVICE AND METHOD FOR CONTROLLING THE SAME

CROSS-REFERENCE TO RELATED APPLICATION

This application is based on and claims priority from Korean Patent Application No. 10-2016-0139096, filed in the Korean Intellectual Property Office on Oct. 25, 2016, the disclosure of which is incorporated herein by reference in its entirety.

BACKGROUND

1. Field

Apparatuses and methods consistent with example embodiments relate to an electronic device and a method for controlling the electronic device, and more particularly, to an electronic device for photographing an area in which a display device is installed, acquiring a background image by analyzing the photographed image, and transmitting the background image to the display device, and a method for controlling the electronic device.

2. Description of Related Art

In recent years, functions for providing various user experiences by using a display device have been developed. As illustrated in FIG. 1, by acquiring the background image for the background behind the display device 200 and displaying the background image on the display device 200, the user can be provided with a visual effect such that the display appears to become a transparent window.

In order to provide such a visual effect, a background image is photographed in the absence of a display device, and the size and angle of the background image are corrected so that the background image displayed on the display device is continuous with the actual background.

In this case, a moiré phenomenon and a distortion phenomenon may occur, depending on the camera condition at the time of acquiring the background image. In addition, in the related art method, after the display device is installed in one place, there may arise a problem that the background image cannot be acquired for the area where the display device is installed.

SUMMARY

One or more example embodiments provide an electronic device which is capable of acquiring an image by photographing an area in which a display device is installed, acquiring a background area of the display device from the acquired image, generating information that relates to the background image by using the acquired background area, and transmitting information that relates to the generated background image to the display device, and a method for controlling the electronic device.

According to an aspect of an example embodiment, there is provided a method for controlling an electronic device that is interlocked with a display device, the method comprising: acquiring an image by photographing an area in which the display device is installed; identifying a display area in which the display device is disposed and a background area of the display device by analyzing the acquired image, and acquiring information that relates to a background image of a position at which the display device is installed based on the identified background area; and transmitting the acquired background image information to the display device.

The display device may display a plurality of markers in a plurality of corner areas, and the acquiring the information that relates to the background image may include identifying the display area in which the display device is disposed and the background area of the display device by using the plurality of markers included in the acquired image, and performing an alignment correction with respect to the display area and the background area by using the plurality of markers.

The acquiring the information that relates to the background image may include, in response to the background area being monochromatic, acquiring the information that relates to the background image by acquiring a red-green-blue (RGB) average value of the background area.

The background area may include a first background area that is positioned at an upper side of the display area, a second background area that is positioned at a lower side of the display area, a third background area that is positioned at a left side of the display area, and a fourth background area that is positioned at a right side of the display area, and the acquiring the information that relates to the background image may include acquiring the information that relates to the background image by analyzing at least one of the first background area, the second background area, the third background area, and the fourth background area.

A size of the display device may be equal to a predetermined multiple of a respective size of each of the first background area, the second background area, the third background area, and the fourth background area, and the acquiring the information that relates to the background image may include acquiring the information that relates to the background image by copying at least one from among the first background area, the second background area, the third background area, and the fourth background area by the predetermined multiple of times.

The acquiring the information that relates to the background image may include acquiring the information that relates to the background image by copying a partial area of at least one from among the first background area, the second background area, the third background area, and the fourth background area in a tile form.

The method may further include displaying the acquired image, and the partial area may be an area that is selected by a user command that relates to the displayed image.

The method may further include displaying a user interface (UI) that includes a plurality of background images generated by using each of the first background area, the second background area, the third background area, and the fourth background area, and the transmitting may include, in response to one from among the plurality of background images being selected, transmitting information that relates to the selected background image to the display device.

The method may further include receiving, from the display device, color temperature information with respect to the background area sensed by a color sensor of the display device, and generating information that relates to a white balance correction of the acquired image based on the received color temperature information.

According to an aspect of an example embodiment, there is provided an electronic device that is interlocked with a display device, the electronic device comprising: a communication interface; a camera; a display; and a processor configured to control the camera to acquire an image by photographing an area in which the display device is installed, to control the display to display the acquired image, to identify a display area in which the display device is disposed and a background area of the display device by analyzing the acquired image, to acquire information that relates to a background image of a position in which the display device is installed based on the identified background area, and to control the communication interface to transmit the acquired background image information to the display device.

The display device may be configured to display a plurality of markers in a plurality of corner areas, and the processor may be further configured to identify the display area in which the display device is disposed and the background area of the display device by using the plurality of markers included in the acquired image, and to perform an alignment correction with respect to the display area and the background area by using the plurality of markers.

The processor may be further configured, in response to the background area being monochromatic, to acquire the information that relates to the background image by acquiring a red-green-blue (RGB) average value of the background image.

The background area may include a first background area that is positioned at an upper side of the display area, a second background area that is positioned at a lower side of the display area, a third background area that is positioned at a left side of the display area, and a fourth background area that is positioned at a right side of the display area, and the processor may be further configured to acquire the information that relates to the background image by analyzing at least one from among the first background area, the second background area, the third background area, and the fourth background area.

A size of the display device may be equal to a predetermined multiple of a respective size of each of the first background area, the second background area, the third background area, and the fourth background area, and the processor may be further configured to acquire the information that relates to the background image by copying at least one from among the first background area, the second background area, the third background area, and the fourth background area by the predetermined multiple of times.

The processor may be further configured to acquire the information that relates to the background image by copying a partial area of at least one from among the first background area, the second background area, the third background area, and the fourth background area in a tile form.

The partial area may be an area that is selected by a user command that relates to the displayed image.

The processor may be further configured to control the display to display a UI that includes a plurality of background images generated by using each of the first background area, the second background area, the third background area, and the fourth background area, and in response to one from among the plurality of background images being selected, to control the communication interface to transmit information that relates to the selected background image to the display device.

The processor may be further configured to control the communication interface to receive, from the display device, color temperature information with respect to the background area sensed by a color sensor of the display device, and to generate information that relates to a white balance correction of the acquired image based on the received color temperature information.

According to an aspect of an example embodiment, there is provided a non-transitory computer readable medium which stores a program to execute a method for controlling an electronic device that is interlocked with a display device, the method comprising: acquiring an image by photographing an area in which the display device is installed; identifying a display area in which the display device is disposed and a background area of the display device by analyzing the acquired image, and acquiring information that relates to a background image of a position in which the display device is installed based on the identified background area; and transmitting the acquired background image information to the display device.

In another aspect, a method for controlling an electronic device that is in communication with a display device is provided. The method includes: obtaining a first image by photographing an area in which the display device is located; determining a portion of the first image as being a background section based on a position of the display device within the first image; analyzing the background section; in response to the analyzing, acquiring information that is usable for generating a second image that is displayable on the display device; and transmitting the acquired information to the display device.

The analyzing may include determining that the background section is monochromatic. The acquiring the information may include acquiring a red-green-blue (RGB) average value that corresponds to a color of the background section.

The analyzing may include determining that the background section includes a repeating pattern. The acquiring the information may include determining image parameters that relate to a matching of the repeating pattern.

The method may further include displaying a user interface (UI) that includes a plurality of thumbnail images generated by using respective portions of the background section, and receiving a user input that corresponds to a selection of one from among the plurality of thumbnail images. The transmitting may further include, in response to the receiving the user input, transmitting information that relates to the selected thumbnail image to the display device.

According to the various example embodiments described above, the background image can be acquired even after the display device is installed, so that the already-installed display device can provide the same image effect as the glass window.

BRIEF DESCRIPTION OF THE DRAWINGS

The above and/or other aspects will become more apparent by reference to example embodiments which are illustrated in the appended drawings. Understanding that these drawings depict only example embodiments and are not therefore to be considered to be limiting of the scope of the disclosure, the principles herein are described and explained with additional specificity and detail via the use of the accompanying drawings, in which:

FIG. 14 is a flowchart illustrating a method of acquiring a background image displayed by a display device, according to an example embodiment.

DETAILED DESCRIPTION

Figure 1:
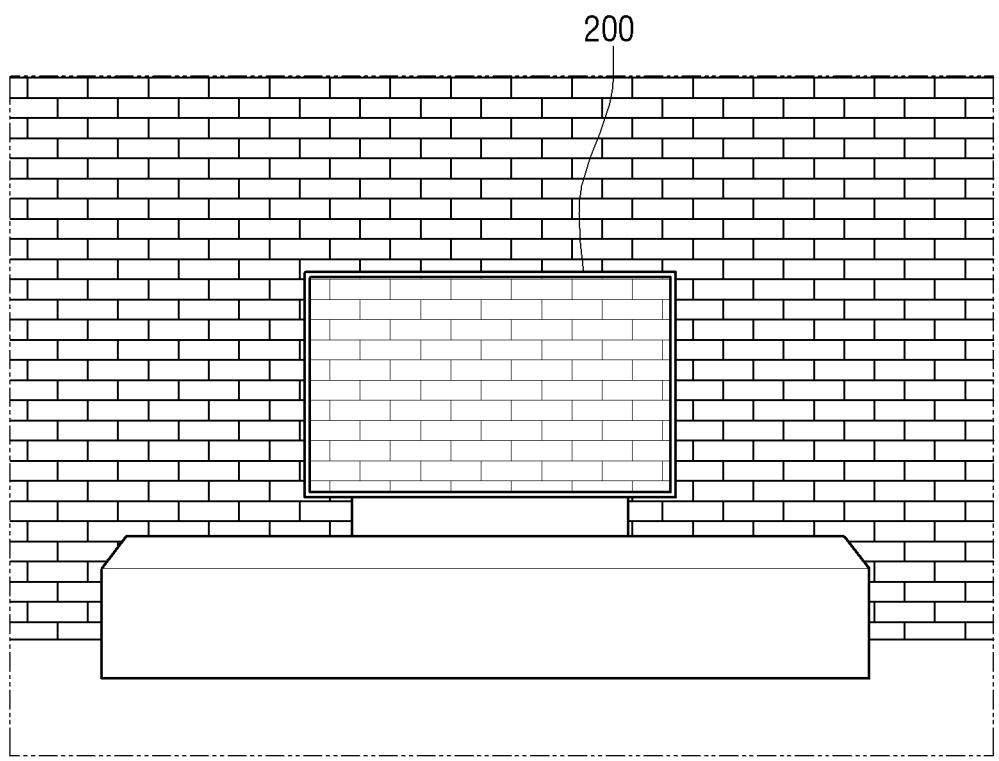
FIG. 1 is a diagram illustrating an example embodiment to provide an image effect as if a display is a transparent window, according to an example embodiment.

Certain example embodiments will now be described in greater detail with reference to the accompanying drawings.

The terms used in the example embodiments of the present disclosure are general terms which are widely used now and selected considering the functions of the present disclosure. However, the terms may vary based on the intention of a person skilled in the art, a precedent, or the advent of new technology. In addition, in a special case, terms selected by the applicant may be used. In this case, the meanings of the terms will be explained in detail in the corresponding detailed descriptions. Accordingly, defining the terms used herein will be based on the meanings of the terms and overall contents of example embodiments, rather than simple names of the terms.

As example embodiments may have a variety of modifications and several examples, certain example embodiments will be exemplified in the drawings and described in detail in the description thereof. However, this does not necessarily limit the scope of the example embodiments to a specific embodiment form. Instead, modifications, equivalents and replacements included in the disclosed concept and technical scope of this specification may be employed. While describing example embodiments, if it is identified that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. In example embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

According to example embodiments, a "module" or "unit" performs at least one function or operation, and may be implemented as hardware (e.g., processor or integrated circuit) or software, or a combination of hardware and software. In addition, a plurality of 'modules' or a plurality of 'units' may be integrated into at least one module and may be realized as at least one processor except for 'modules' or 'units' that should be realized as specific hardware.

Throughout the example embodiments, when a certain portion is stated as being "connected" with another, this means that the portion may not only be "directly connected", but may also be "electrically connected" while another element intervenes therebetween. In addition, the term "connected" means that a portion is "physically connected" as well as "wirelessly connected". Further, when a certain portion is stated as "comprising" a certain element, unless otherwise stated, this means that the certain portion may include another element, rather than foreclosing the same.

Hereinbelow, certain example embodiments will now be described in greater detail with reference to the accompanying drawings to enable those skilled in the art to work the same with ease. However, example embodiments may be realized in a variety of different configurations, and not limited to descriptions provided herein. Further, those that are irrelevant with the description are omitted so as to describe example embodiments more clearly, and similar drawing reference numerals are used for the similar elements throughout the description.

Figure 2:
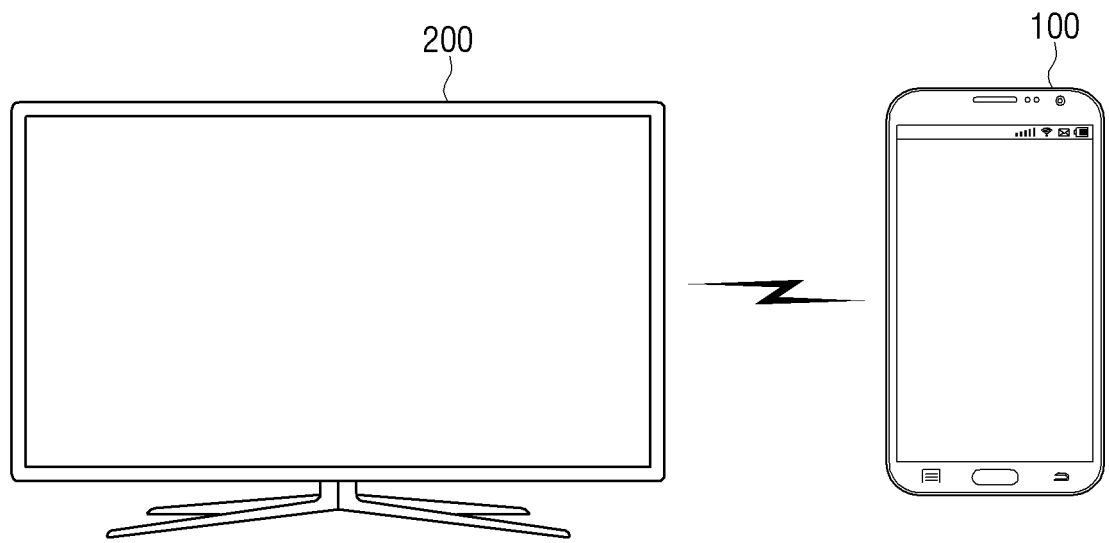
FIG. 2 is a diagram illustrating a system for installing a display device that provides an image effect of FIG. 1, according to an example embodiment.

Below, example embodiments will be described in detail with reference to the accompanying drawings. FIG. 2 is a diagram illustrating a system 10 for installing a display device 200 that provides an image effect of FIG. 1, according to an example embodiment. As illustrated in FIG. 2, the system 10 for installing the display device 200 may include the display device 200 and an electronic device 100. The display device 200 may be implemented as a digital television (TV), but is not limited thereto. In particular, the display device 100 may be realized as any of various types of display devices, such as a desktop personal computer (PC), a kiosk, and the like. The electronic device 100 may be realized as a smartphone, but is not limited thereto. In particular, the electronic device 100 may be realized as any of various types of electronic devices such as a remote controller, a personal digital assistant (PDA), a tablet PC, a notebook PC, and the like.

Specifically, the display device 200 may be installed in a particular position (e.g., a wall).

After the display device 200 is installed, the electronic device 100 may photograph a position at which the display device 200 is installed and acquire images that include the display device 200 and a background image of a peripheral area of the display device 200.

In addition, the electronic device 100 may analyze the image to identify a display area in which the display device 200 is positioned and a background area of the display device 200, and acquire information that relates to a background image of an area in which the display device 200 is installed based on the identified background area.

When the background area is colored in one color, the electronic device 100 may acquire the information that relates to the background image by using color information (e.g., a red-green-blue (RGB) average value) of the background area. When the background area is of a predetermined pattern, the electronic device 100 may copy a part of the background area of the display device 200 in order to acquire the information that relates to the background image.

In this case, the electronic device 100 may acquire information that relates not only to an image of the background image, but also to various background images, such as white balance information, and the like.

Then, the electronic device 100 may transmit the information that relates to the acquired background image to the display device 200.

The display device 200 may provide an image effect (hereinafter, "glass window effect") of FIG. 1 based on the information that relates to the acquired background image.

Figure 3:
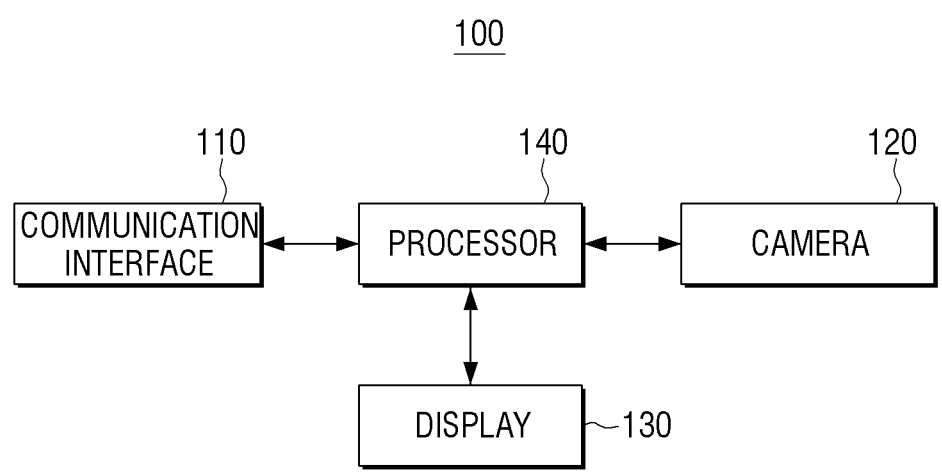
FIG. 3 is a block diagram briefly illustrating a configuration of an electronic device for acquiring a background image displayed by a display device, according to an example embodiment.

FIG. 3 is a block diagram briefly illustrating a configuration of an electronic device that provides a background image to a display device 200 that provides a glass window effect, according to an example embodiment. As illustrated in FIG. 3, the electronic device 100 may include a communication interface 110, a camera 120, a display 130, and a processor 140. The electronic device 100 may be realized as a smartphone as mentioned above, but is not limited thereto. In particular, the electronic device 100 may be realized as any of various types of portable terminals, such as a PDA, a remote controller, a tablet PC, a notebook PC, and the like.

The communication interface 110 may be configured to communicate with various external devices. In particular, the communication interface 110 may communicate with the display device 200 and transmit information that relates to a background image of an area in which the display device 200 is positioned to the display device 200. In addition, the communication interface 110 may receive, from the display device 200, color temperature information that relates to a background area of the display device 200.

The camera 120 may be disposed at a rear surface (i.e., the opposite surface to a surface at which the display 130 is arranged) of the electronic device 100, and may be configured to photograph an image. In particular, the camera 120 may acquire images that include a display area in which the display device 200 is positioned and a background area of a peripheral area of the display device 200. In this case, the camera 120 may include a lens and an image sensor.

The display 130 may output image data. In particular, the display 130 may be configured to display an image (i.e., an image that includes a display area and a background area) photographed by the camera 120. In this case, the display 130 may display an indicator to guide a position of the display device 200 in order to distinguish between a display area and a background area. In addition, the display 130 may display a user interface (UI) that includes a plurality of background images generated by using a plurality of background areas.

The processor 140 may be configured to control overall operations of the electronic device 100. In particular, the processor 140 may analyze an image acquired by the camera 120 in order to identify a display area in which the display device 200 is disposed and a background area of the display device 200. In addition, the processor 140 may acquire information that relates to a background image in which the display device 200 is installed based on the identified background area, and control the communication interface 110 to transmit information that relates to the acquired background image information to the display device 200.

In an aspect, when the display device 200 displays a plurality of markers in a plurality of edge areas, the processor 140 may identify a display area in which the display device 200 is disposed and a background area of the display device 200 by using a subset of the plurality of markers which is included in the acquired image. In addition, the display device 200 may compensate an alignment with respect to the display area and the background area by using the subset of the plurality of markers.

In addition, the display device 200 may acquire information that relates to a background image by using a background area from among the display area and the background area.

When the background area is colored in one color, the processor 140 may acquire an RGB average value of the background area in order to acquire information that relates to the background image.

In addition, when the background area includes a first background area that is located at an upper side of the display area, a second background area that is located at a lower side of the display area, a third background area that is located at a left side of the display area, and a fourth background area that is located at a right side of the display area, the processor 140 may be further configured to analyze at least one of the first background area, the second background area, the third background area, and the fourth background area in order to acquire information that relates to the background image. In particular, when the display device 200 has a size that is equal to a predetermined multiple of a respective size of each of the first background area, the second background area, the third background area, and the fourth background area, the processor 140 may copy (i.e., reproduce) at least one from among the first background area, the second background area, the third background area, and the fourth background area by a predetermined multiple of times in order to acquire information that relates to the background image. In addition, the processor 140 may copy at least one part of the first background area, the second background area, the third background area, and the fourth background area in a tile form in order to acquire information that relates to the background image. In this case, the at least one part of the first background area, the second background area, the third background area, and the fourth background area may be an area selected by a user.

In addition, the processor 140 may control the communication interface 110 to receive, from the display device 200, color temperature information that relates to a background area detected by the color sensor of the display device 200. In addition, the processor 140 may generate information that relates to a white balance correction of the acquired image based on the color temperature information.

The processor 140 may control the communication interface 110 to transmit the information that relates to the acquired background image to the display device 200. In particular, the processor 140 may control the display 130 to display a user interface (UI) that includes a plurality of background images generated by using each of the first background area, the second background area, the third background area, and the fourth background area. Then, when one of the plurality of background images is selected, the processor 140 may control the communication interface 110 to transmit information that relates to the selected background image to the display device 200.

Figure 4:
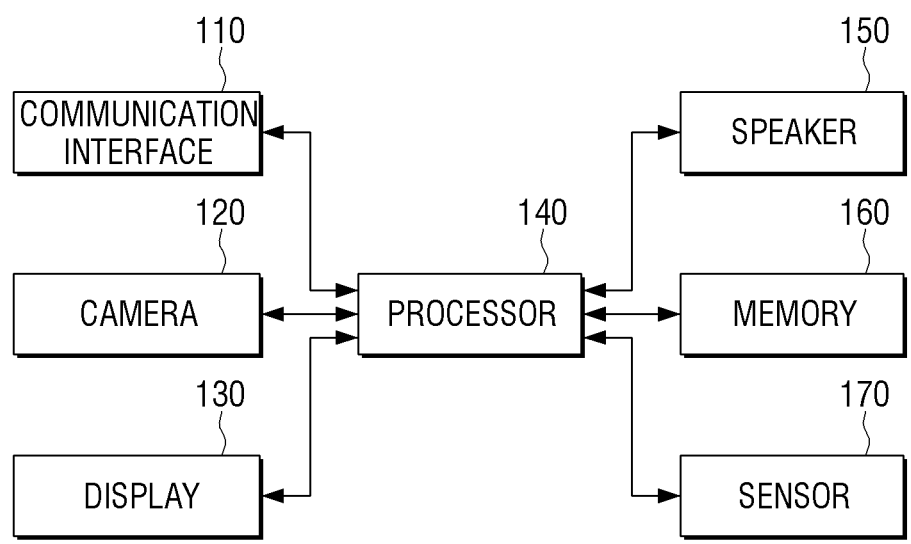
FIG. 4 is a detailed block diagram illustrating a configuration of an electronic device for acquiring a background image displayed by a display device, according to an example embodiment.

FIG. 4 is a detailed block diagram illustrating a configuration of the electronic device 100 used for installing a display device that provides a glass window effect. As illustrated in FIG. 4, the electronic device 100 includes a communication interface 110, a camera 120, a display 130, a speaker 150, a memory 160, a sensor 170, and a processor 140. In this aspect, the elements of the electronic device 100 illustrated in FIG. 4 represent merely one of example embodiments, and may not be necessarily limited to the block diagram described above. Thus, the electronic device 100 illustrated in FIG. 4 may be partly omitted or modified, or added according to the type or purpose of the electronic device 100.

The communication interface 110 performs communication with an external display apparatus 200 and/or with an external server. In particular, the communication interface 110 may include any or all of an RF communication module, a Bluetooth (BT) communication module, a wireless fidelity (WiFi) communication module, and an infrared ray (IR) communication module, and each communication module may be realized as any of a connectivity chip, a circuitry, a communication interface, and the like.

The RF communication module may receive one RF signal from among various radio frequency identification (RF-ID) frequency bands, such as 135 kHz, 13.56 MHz, 433 MHz, 860-960 MHz, 2.45 GHz, and the like. The BT communication module and the WiFi communication module may transmit and receive any of various kinds of connection information such as a subsystem identification (SSID). For example, in an example embodiment, a session key and the like is transmitted and received first, and in order to establish a communication link, and then, various information is transmitted and received. In particular, the electronic device 100 may perform communication with an external display device 200 using the BT communication module or the WiFi communication module. In this case, one or more Bluetooth chips or the WiFi chips may be included. In addition, the communication interface 110 may communicate with an external device via any of various communication modules, such as ZigBee communication module and a near field communication (NFC) communication module.

The communication interface 110 may communicate with the display device 200 by using the first communication module (e.g., BT communication module), and communicate with an external server by using a second communication module (e.g., WiFi communication module). However, this is only an example, and the communication interface 110 may communicate with the display device 200 or an external server by using the same type of communication module.

The camera 120 photographs an image or a plurality of images. In this case, the camera 120 may acquire images that include a display area in which the display device 200 is installed and a background area of a peripheral area of the display device 200. In this case, the camera 120 may be a dual camera that has a plurality of camera modules, but the example is not limited thereto, and one camera module may be provided in the dual camera. In addition, the camera 120 may be disposed on the opposite side of a surface in which the display 130 is disposed, and thereby a user can view a photographed image while photographing an image.

The display 130 displays various image data and a user interface (UI). In particular, the display 130 may display an image (i.e., an image that includes a display area and a background area) which has been photographed by the camera 120. In addition, the display 130 may display various UIs and indicators for acquiring information that relates to a background image to be displayed by the display device 200.

In accordance with one example embodiment, the display 130 may be combined with a touch sensor and be realized as a touch screen, and may be disposed in at least two areas from among a front area, a side area, and a rear area of the electronic device 100 in the form of a flexible display. Due to the use of a substrate which is as thin and flexible as a paper sheet, the flexible display may have such characteristic that it can be bent, curved, or rolled without being damaged.

The speaker 150 may include various audio output circuitry and is configured to output various kinds of alarm sounds or voice messages in addition to various audio data on which various processing operations such as decoding, amplification, and noise filtering are performed by an audio processor. In accordance with another example embodiment, the speaker 150 may provide a guide message in an audio format when the display device 200 is installed.

The memory 160 stores various modules to drive the electronic apparatus 100. For example, software that includes any of a base module, a sensing module, a communication module, a presentation module, a web browser module, and a service module, or the like may be stored on the memory 160. In this case, the base module includes a basic module that processes signals transferred from each hardware component included in the electronic apparatus 100 and transfers the processed signals to an upper layer module. The sensing module is a module that collects information from various sensors and analyzes and manages the collected information, and may include any of a face recognizing module, an audio recognizing module, a motion recognizing module, an NFC recognizing module, and the like. The presentation module is a module for configuring a display screen and may include a multimedia module for playing and outputting multimedia contents and a UI rendering module for performing UI and graphic processing. The communication module is a module for performing communication with the outside (i.e., external devices and other external entities). The web browser module is a module for performing web browsing in order to access a web server. The service module corresponds to a module that includes various applications which are configured to provide various services.

As described above, the memory 160 may include various types of program modules, and some of the various types of program modules may be omitted, modified, or added according to a type and a characteristic of the electronic apparatus 100'.

The storage 160 may store information that relates to an application being used when the display device 200 is installed.

The sensor 170 may be implemented as any of various sensors which are configured for sensing a user command. The sensor 170 may include a touch sensor. The sensor 170 may sense various information by using any of various sensors. For example, the sensor 170 may sense motion information by using a motion sensor (e.g., acceleration sensor, gyro sensor, terrestrial magnetism sensor, etc.).

The processor 140 may be configured to control overall operations of the electronic device 100. In addition, the processor 140 may analyze a background of an area in which the display device 200 is to be installed within a guide member among photographed images in order to acquire information that relates to a background image of a position at which the display device 200 is installed, and control the communication interface 110 to transmit information that relates to the background image to the display device 200.

Figure 5:
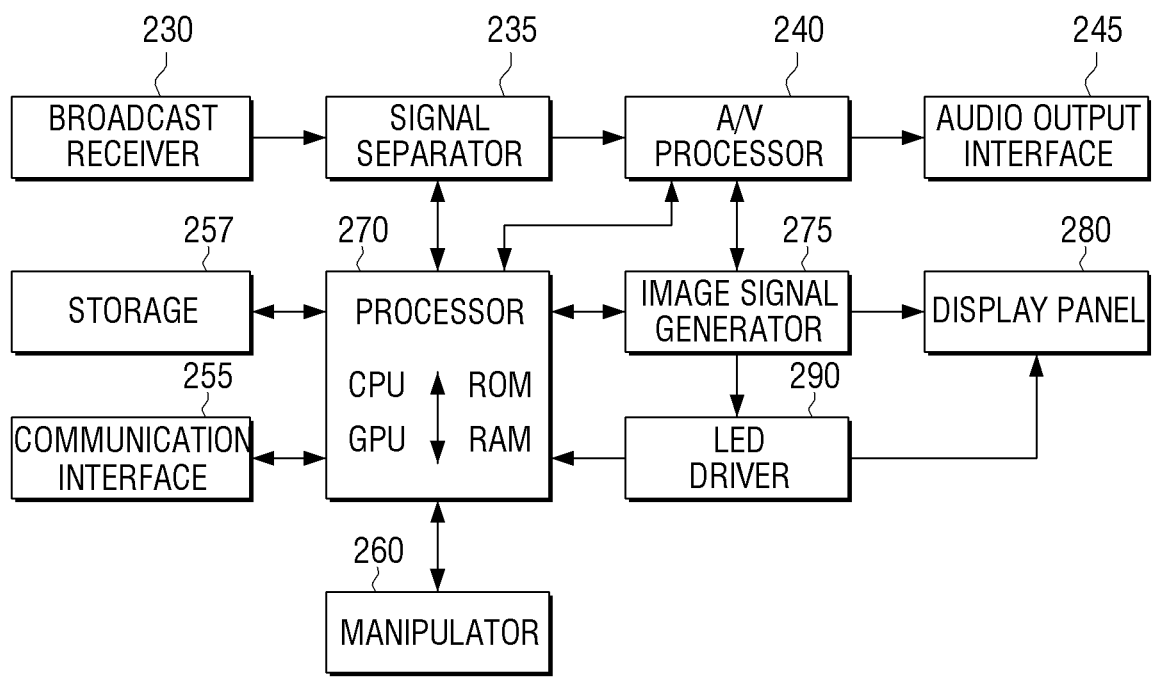
FIG. 5 is a block diagram illustrating a configuration of a display device providing an image effect of FIG. 1, according to an example embodiment.

FIG. 5 is a block diagram illustrating a configuration of a display device providing a glass window effect, according to an example embodiment. Referring to FIG. 5, a display device 200 according to this example embodiment includes a broadcast receiver 230, a signal separator 235, an audio/video (A/V) processor 240, an audio output interface 245, a storage 257, a communication interface 255, a manipulator 260, a processor 270, an image signal generator 275, a display panel 280, and a light-emitting diode (LED) driver 290.

The broadcast receiver 230 receives a broadcasting signal in a wired or wireless manner from a broadcasting station or a satellite, and demodulates the received broadcasting signal. In particular, the broadcast receiver 200 may receive a transmission stream via an antenna or a cable and demodulate the transmission stream, and output a digital transmission stream signal (specifically, any of a clock signal (TS_CLK), a sync signal (TS_SYNC), a valid signal (TS_VALID), and eight data signals (TS_DATA[7.0]). The broadcast receiver 230 may receive a broadcast signal from an external device (for example, a set-top box).

The signal separator 235 divides a transmission stream signal provided from the broadcast receiver 230 into an image signal, an audio signal, and additional information signal. Further, the signal separator 235 transmits the image signal and the audio signal to the A/V processor 240.

The A/V processor 240 performs various signal processing functions, such as video decoding, video scaling, and audio decoding, with respect to the video signal and the audio signal that are input from the broadcast receiver 230 and/or the storage 257. In addition, the A/V processor 240 outputs the image signal to the image signal provider 220 and outputs the audio signal to the audio output interface 245.

In the case of storing the received video and audio signals in the storage 250, the A/V processor 240 may compress the video and audio signals and store the compressed video and audio signals in the storage 257.

The audio output interface 245 converts the audio signal that is output from the A/V processor 240 into sound, and outputs the sound through a speaker or to an external device connected thereto through an external output terminal.

The image signal generator 275 may generate a graphical user interface (GUI) to provide the generated GUI to a user. Further, the image signal generator 275 may add the generated GUI to an image that is output from the A/V processor 240. In addition, the image signal generator 275 provides an image signal that corresponds to an image to which a GUI is added to the display panel 280. The display panel 280 displays various information provided from the display device 200 and an image transmitted from the image signal generator 275.

In addition, the image signal generator 270 may acquire brightness information that corresponds to an image signal, and generate a dimming signal that corresponds to the acquired brightness information. In addition, the image signal generator 275 may provide the generated dimming signal to the display panel 280. Such a dimming signal may be a pulse width modulation (PWM) signal. It is described in this example embodiment that the image signal generator 275 generates a dimming signal and provides it to the display panel, but it may be implemented such that the display panel 280 which receives the image signal may generate a dimming signal in itself and use the dimming signal.

The display panel 280 displays an image. Such display panel 280 may be implemented as any of various types of displays, such as an Liquid Crystal Display (LCD), an Organic Light Emitting Diodes (OLED) display, and a Plasma Display Panel (PDP). In the display panel 280, a driving circuit and a backlight unit, which can also be implemented in the form of an amorphous silicon (a-Si) TFT, a LTPS (Low Temperature Poly Silicon) TFT, or an Organic TFT (OTFT), may be included in the display panel 280. In this aspect, the display panel 280 may be realized as a touch screen as it is combined with a touch detector.

When the display panel 280 is configured by an LCD panel which transmits light emitted from a backlight through an LCD, or displays the degree of transmittance and displays gradation, the display panel 280 receive power required for the backlight via a power supply, and transmits the LCD emitted from the backlight to the LC. In addition, the display panel 280 may receive power for use in a pixel electrode and a common electrode from the power supply, and display an image by adjusting each LC based on the image signal received in the image signal generator 275.

In this case, the backlight device is a configuration for emitting light to an LCD, and may include any of a cold cathode fluorescent lamp (CCFL), a light emitting diode (LED), and the like. Hereinafter, it will be illustrated and described that the backlight device is configured with an LED and an LED driving circuit. However, at the time of implementation, the backlight device may be realized as a feature other than the LED.

When an LED is used to emit light, it is necessary that the backlight device includes an LED driver unit for driving LED. In particular, the LED driver unit is a configuration for providing static current that corresponds to a brightness value to the LED so that the backlight device is operated with a brightness value that corresponds to dimming information provided from the image signal generator 275. Such an LED driver unit may not provide static current to the LED based on the dimming signal.

In addition, when the display panel 280 is an OLED panel, the display panel 200 may display an image to correspond to an image signal provided from the image signal generator 275, which will be described below, and a driving power supplied from a power supply unit. To this end, the OLED panel 280 may include a number of pixels that include an organic electroluminescent diode. In this case, the organic electroluminescent diode refers to a 'self-luminous organic material" which emits light by itself by using an electroluminescent phenomenon in which light is emitted when current flows in a fluorescent organic compound.

The LED driver 290 drives the display panel 280 according to a control of the processor 270.

The storage 257 may store image content. In particular, the storage 257 may receive and store image content, in which video and audio are compressed, from the A/V processor 240, and may output the stored image content to the A/V processor 240 under the control of the processor 270. The storage 250 may be implemented by any of a hard disk, a nonvolatile memory, and/or a volatile memory.

The manipulator 260 is implemented as any of a touch screen, touch pad, key button, keypad, and the like, in order to facilitate a user manipulation of the display device 200. In the present example embodiment, an example in which a control command is received via the manipulator 260 included in the display device 200 is described, but the manipulator 260 may receive a user manipulation from an external control device (e.g., remote controller).

The communication interface 255 is configured to communicate with various kinds of external devices in various communication methods. The communication interface 255 may include a Wi-Fi chip and a Bluetooth chip. The processor 270 may perform the communication with various external devices by using the communication interface 255. For example, the communication interface 255 may perform communication with the external electronic devices 100.

In addition, according to example embodiments, the communication interface 255 may further include a universal serial bus (USB) port to which a USB connector is connected, various external input ports for connecting various external terminals such as a headset, mouse, and local area network (LAN), and a DMB chip that receives and processes a DMB (Digital Multimedia Broadcasting) signal.

The display device 200 may further include a power supply unit and a sensing unit. The power supply unit may supply power to the respective constituent elements in the display device 200. In particular, the power supply unit may generate a plurality of driving powers having different potentials, and feedback-control the voltage value of one of the driving powers.

In addition, the sensing unit may include a sensor which is configured for acquiring various sensing information. In particular, the sensing unit may include a color sensor which is configured to acquire information that relates to a color temperature of a background area peripheral to the display device 200. In addition, the sensing unit may include any of various sensing devices such as a camera, a motion sensor, and the like.

The processor 270 controls overall operations of the display apparatus 200. For example, the processor 270 may control the image signal generator 275 and the display panel 280 so that an image according to a control command received via the manipulator 260 is displayed. In particular, the processor 270 may include a central processing unit (CPU), a graphics processing unit (GPU), read-only memory (ROM) and random access memory (RAM) as illustrated in FIG. 5.

The processor 270 may control the communication interface 255 to receive information that relates to a background image from the electronic device 100. In addition, the processor 270 may generate a background image layer based on the received information that relates to the background image.

In addition, the processor 270 may generate one image by synthesizing a background image layer with an image layer generated in the GPU or an image layer generated in the A/V processor 240.

In addition, the processor 270 may control a picture quality of at least one of a plurality of image layers based on a sensed value (e.g., color temperature information, etc.) sensed by the sensing unit.

In particular, the processor 270 may be operated in one of a first mode (background mode) for synthesizing a background image layer received from the electronic device 100 with an image layer generated in the GPU or an image layer generated in the A/V processor 240 and a second mode (TV mode) for providing only one of the image layer generated in the GPU and the image layer generated in the A/V processor 240 according to a user manipulation.

Hereinafter, a method of acquiring a background image that is used by the electronic device 100 to provide a glass window effect to the display device 200 will be described with reference to FIGS. 6A to 13.

First, the electronic device 100 executes an application for acquiring a background image that is used to provide a glass window effect to the display device 200. In this case, the electronic device 100 may execute the application according to a user command, but this is only an example, and the application may be executed by recognizing an indicator, such as a quick response (QR) code, and the like, displayed in the display device 200.

Figure 6A:
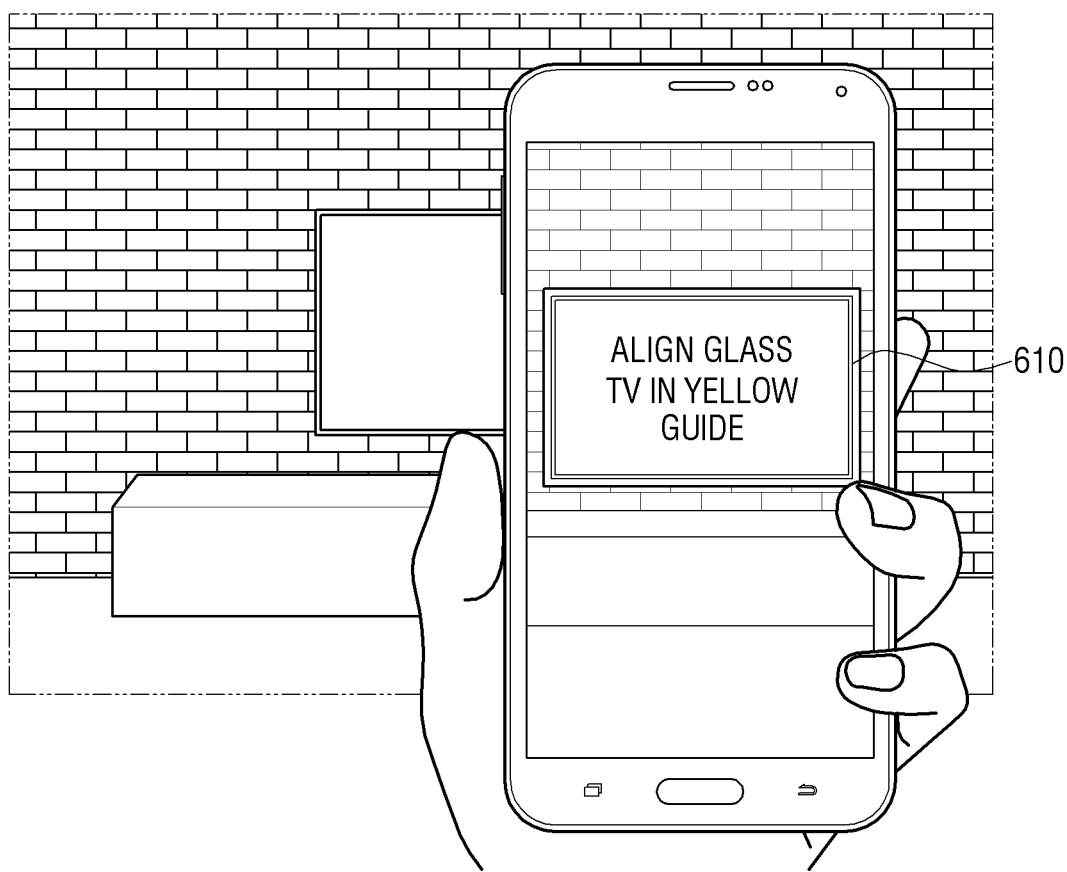
FIGS. 6A to 13 are diagrams illustrating methods of acquiring a background image that is used for an electronic device to provide a glass window effect to a display device, according to an example embodiment.
Figure 6B:
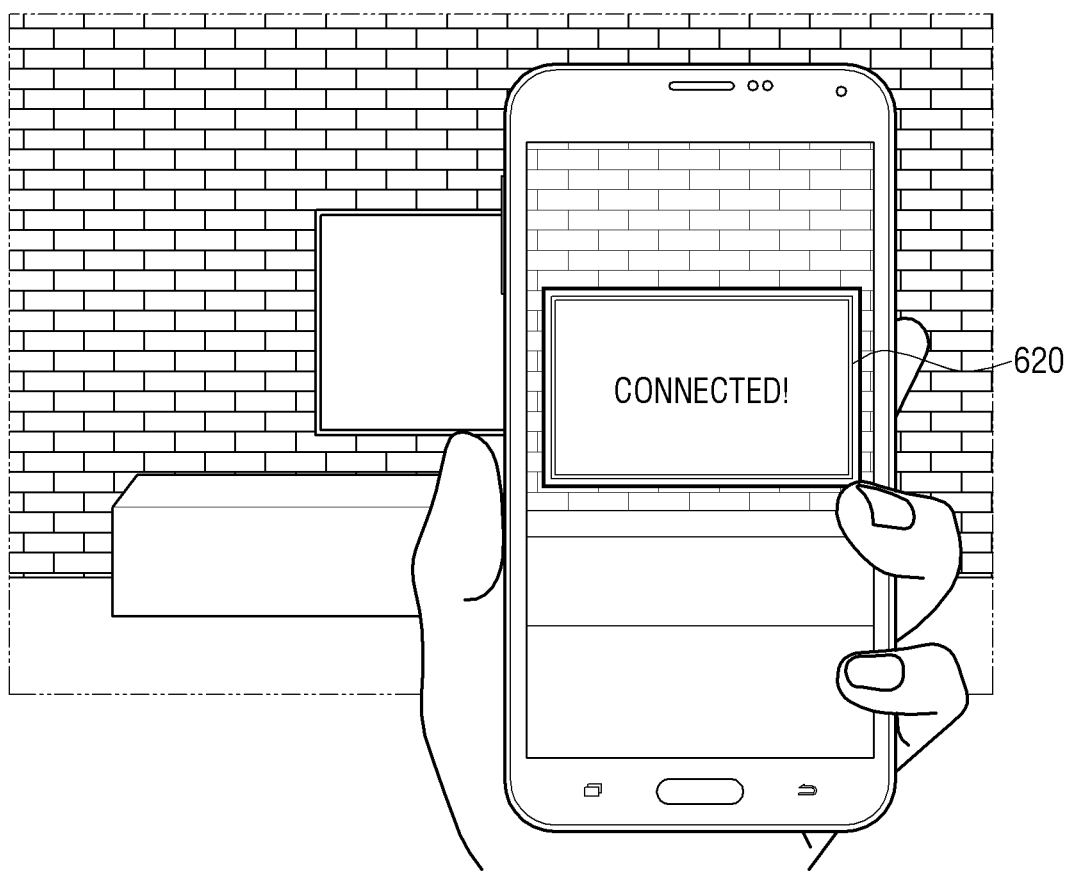

In addition, the electronic device 100 communicates with the display device 200. In this case, the electronic device 100 may communicate with the display device 200 via a UI included in the application. In addition, the electronic device 100 may include a UI 610 that corresponds to a shape of the display device 200 as illustrated in FIG. 6A. In this case, the UI 610 may include a message "Align the display device 200 in the yellow guide". When the photographed display device 200 enters the UI 610, the electronic device 100 may recognize the display device 200, acquires information (e.g., address information of the display device 200, etc.) for communication with the display device 200, and communicate with the display device 200. In this case, the electronic device 100 may display a communication connection complete message 620 as illustrated in FIG. 6B.

It is described in the above example embodiment that the electronic device 100 and the display device 200 communicate with each other after the application is executed, but this is only an example, and communication between the electronic device 100 and the display device 200 may have been established before the application is executed.

The electronic device 100 may acquire an image that includes a display area in which the display device 200 is displayed and a background area peripheral to the display device 200 via the camera 120.

In addition, the electronic device 100 may analyze the acquired image and identify a display area in which the display device 200 is displayed and a background area peripheral to the display device 200.

Figure 7A:
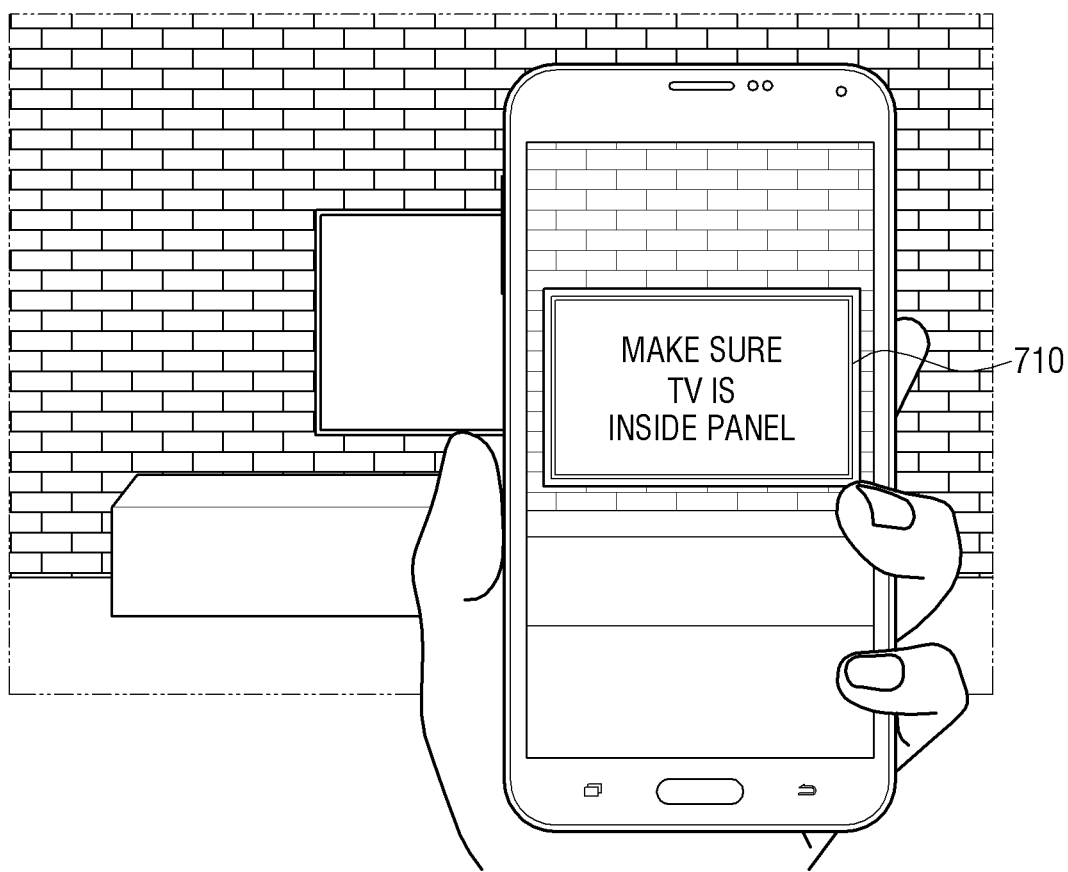
Figure 7B:
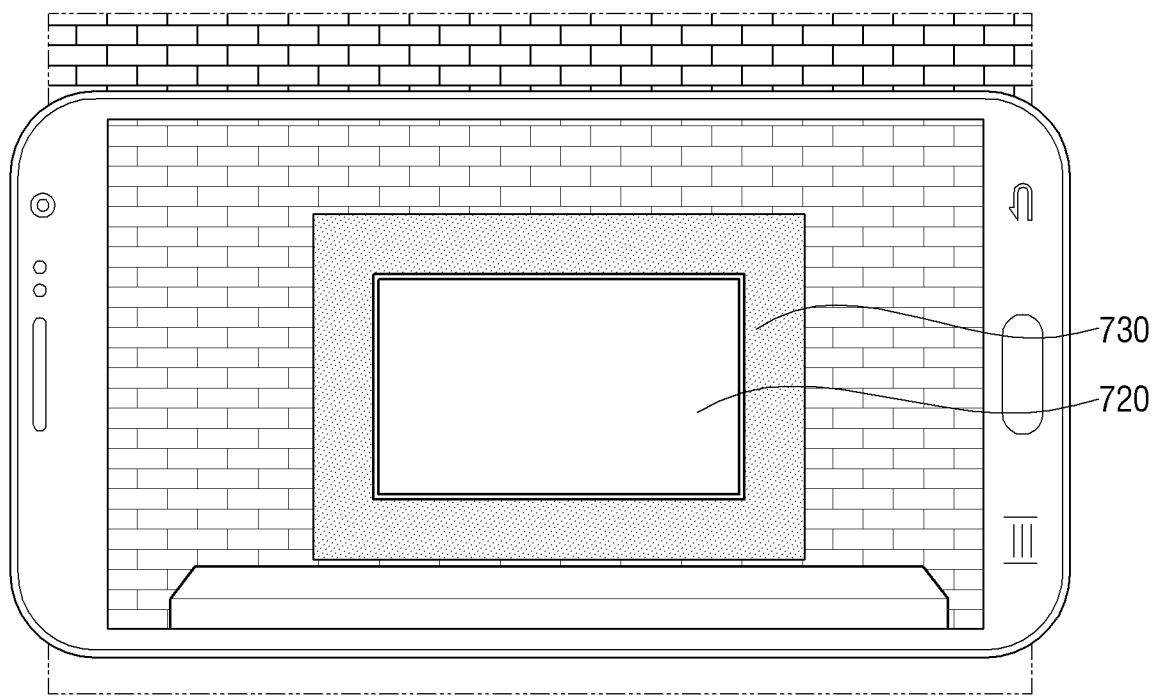

As an example embodiment, the electronic device 100 may display an indicator 710 for guiding a position of the display device 200 in order to distinguish between the display area and the background area as illustrated in FIG. 7A. In particular, the indicator 710 may correspond to a shape of the display device 200. Referring to FIG. 7B, when the display device 200 in an image photographed according to a user motion is matched with the indicator 710, the electronic device 100 may identify a display area 720 by obtaining an outer portion of the display device 200 via the indicator 710, and identify an area that is within a predetermined range from the display area 720 as a background area 730.

Figure 8A:
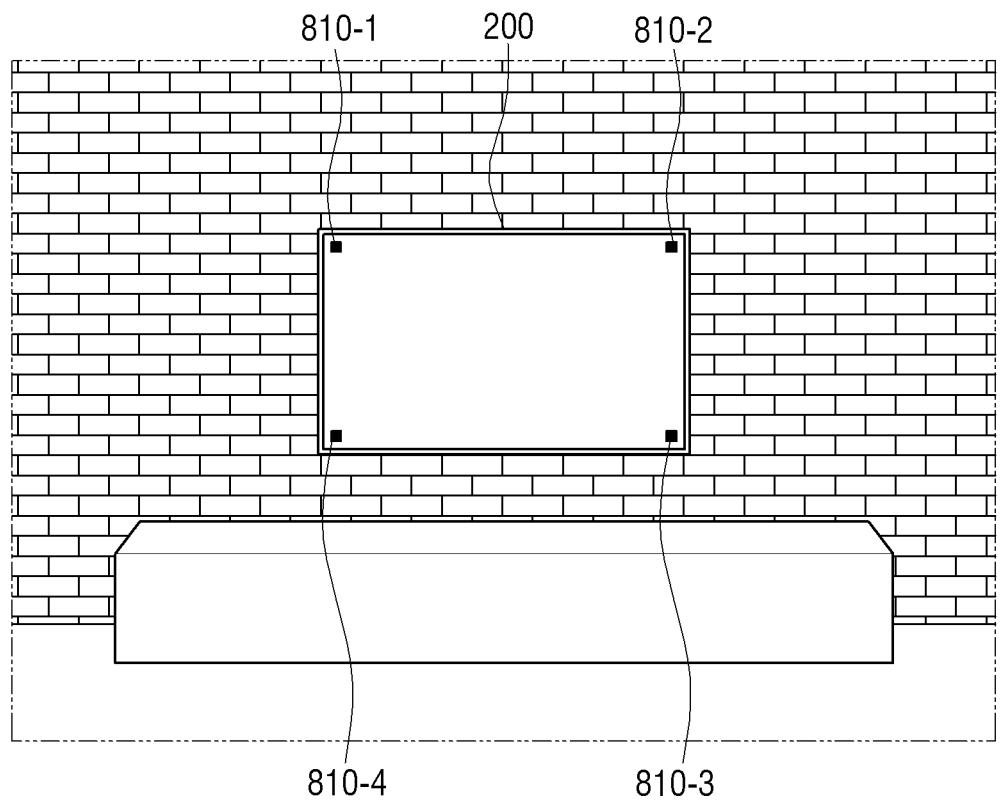

In another example embodiment, the display device 200 may display four markers 810-1, 810-2, 810-3, and 810-4 in the four corners of the display device 200 as illustrated in FIG. 8A. In this case, the display device 200 may display the four markers 810-1, 810-2, 810-3, and 810-4 when a marker generation command is received from the electronic device 100.

Figure 8B:
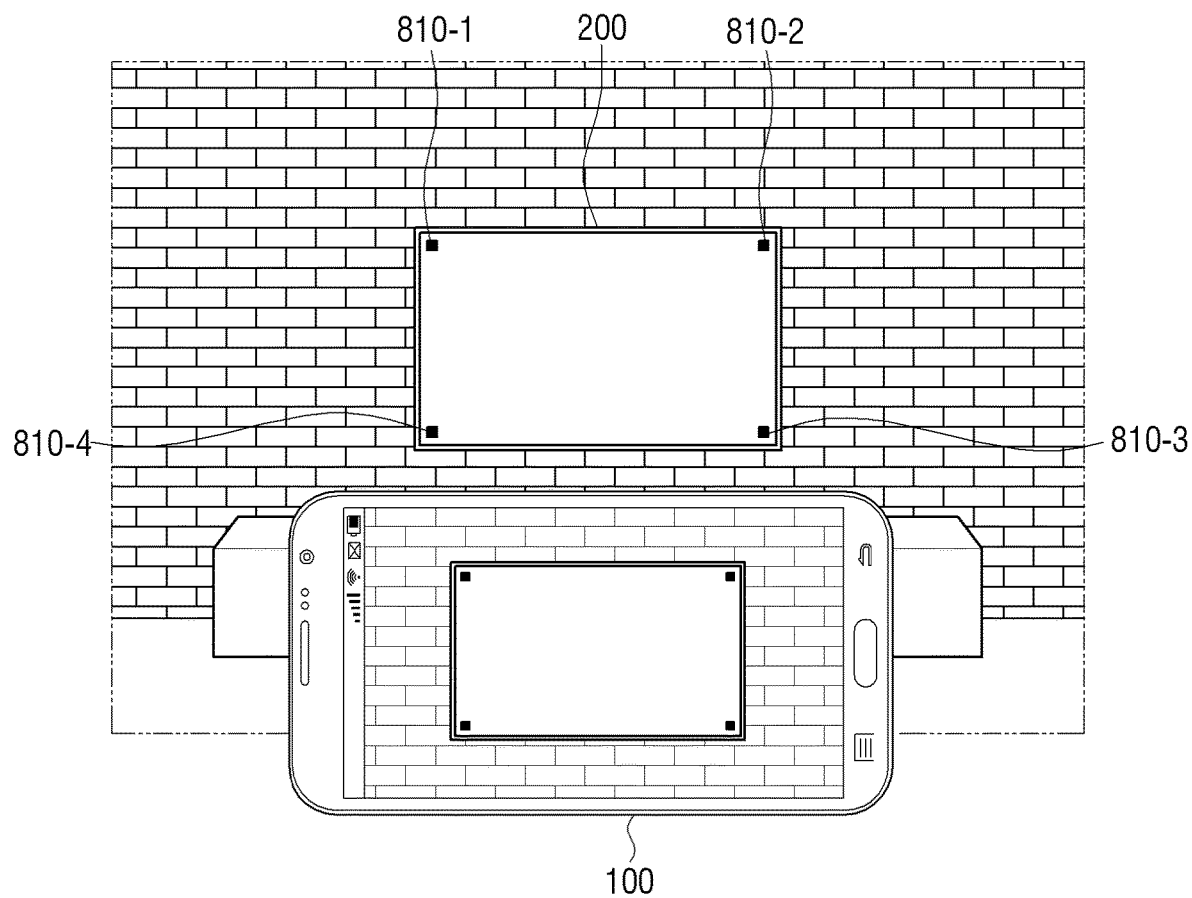

In addition, the electronic device 100 may photograph an image that includes a display device in which the four markers 810-1, 810-2, 810-3, and 810-4 are displayed as illustrated in FIG. 8B. The electronic device 100 may acquire an outer portion of the display device 200 by using the four markers 810-1, 810-2, 810-3, and 810-4 among the photographed images to identify a display area, and identify an area within a predetermined range from the display area as a background area. In this case, the electronic device 100 may compensate alignment with respect to the display area and the background area by using the four markers 810-1, 810-2, 810-3, and 810-4.

In addition, the electronic device 100 may analyze a background area among the acquired images, and acquire information that relates to a background image to be displayed by the display device 200. In particular, the electronic device 100 may identify whether a pattern is present in the background area. In this case, when the background area is a monochromatic background having no pattern, the electronic device 100 may identify an RGB average value of the background area and acquire information that relates to the background image.

Figure 9A:
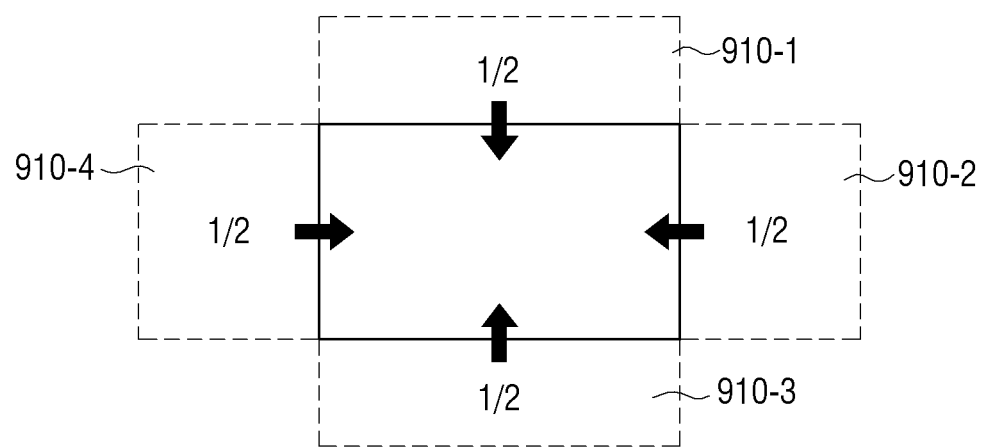
Figure 9B:
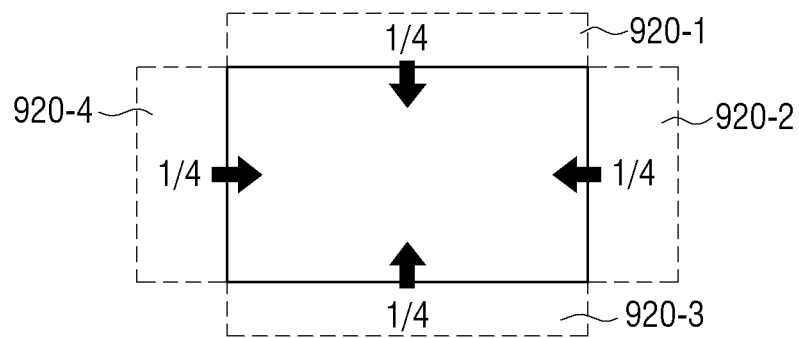
Figure 9C:
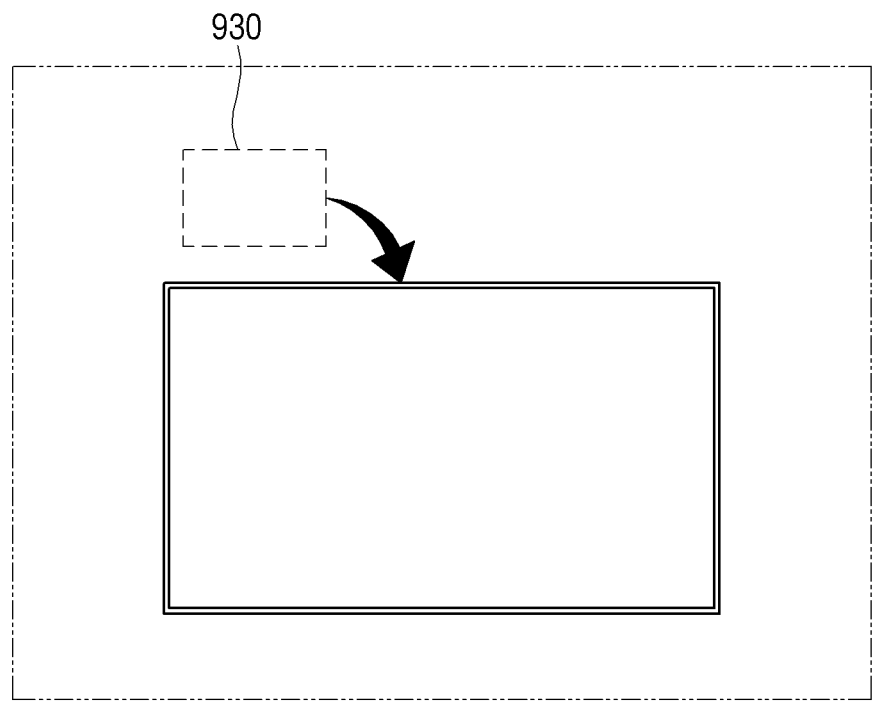

When it is identified that a pattern exists in the background area, the electronic device 100 may analyze a plurality of background areas in order to acquire information that relates to the plurality of background images. In particular, the background area may include a first background area which is located in the upper side of the display area, a second background area which is located in the right side of the display area, a third background area which is located in the lower side of the display area, and a fourth background area which is located in the left side of the display area. In this case, the display device 200 may have a predetermined multiple number size as compared with respective sizes of the first, second, third, and fourth background areas. For example, as illustrated in FIG. 9A, the display device 200 may have a size that is twice as large as each of the first, second, third, and fourth background areas 910-1, 910-2, 910-3, and 910-4 as illustrated in FIG. 9A, and have a size that is four times as large as each of the first, second, third, and fourth background areas 920-1, 920-2, 920-3, and 920-4 as illustrated in FIG. 9B. In another example, as illustrated in FIG. 9C, a part 930 of the background area may be selected in order to acquire information that relates to the background image.

Figure 10A:
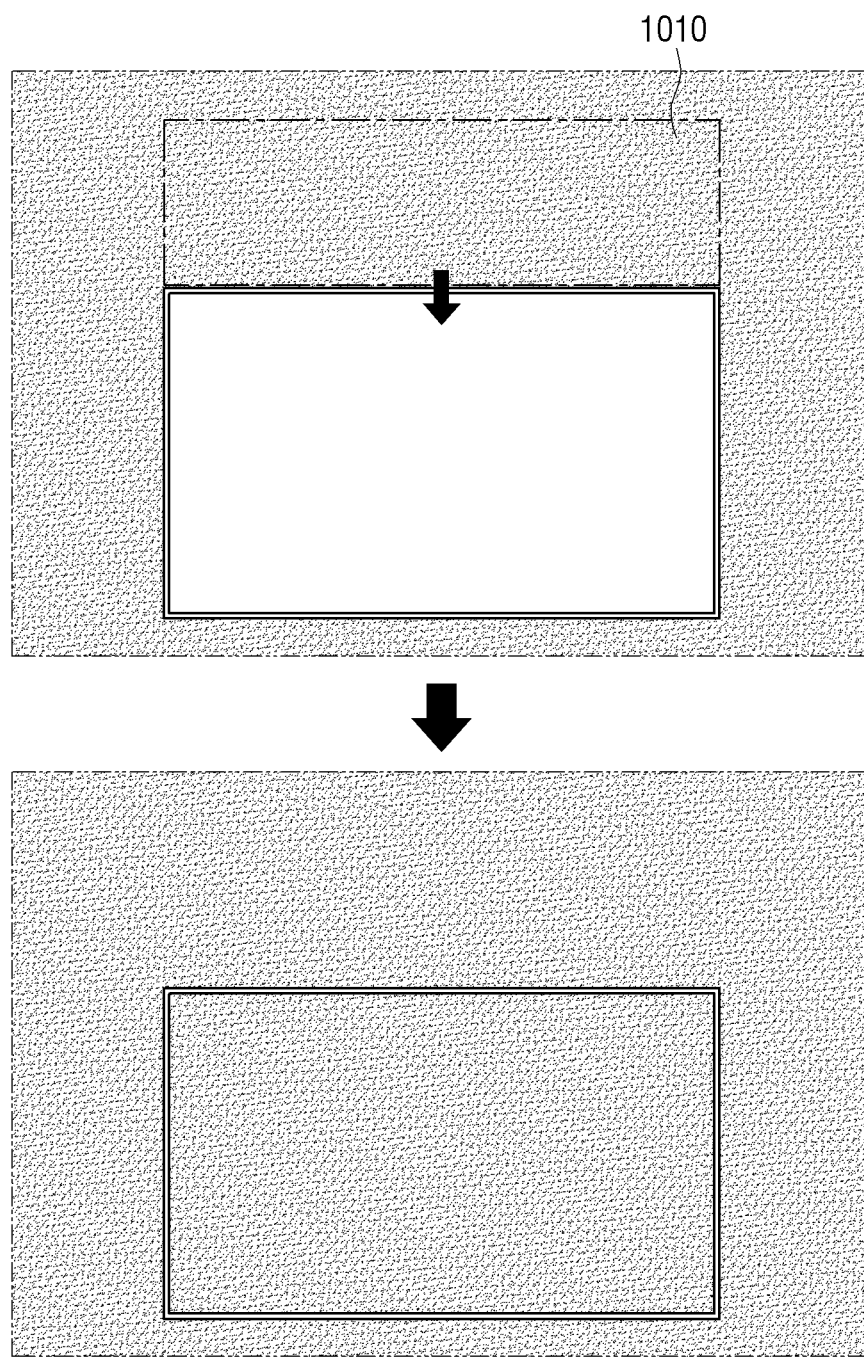

In addition, the electronic device 100 may acquire a background image by using each of the plurality of background areas. For example, the electronic device 100 may acquire a first background image by using an upper background area 1010 of the display device 200 as illustrated in FIG. 10A. When a size of the upper background area is half of a size of the display device 200, the electronic device 100 may copy the upper background area 1010 twice to acquire a background image. The electronic device 100 may acquire a second background image by using a right background area in this manner, acquire a third background image by using a lower background area, and acquire a fourth background image by using a left background image.

In another example embodiment, the electronic device 100 may acquire a background image by using only at least one of a plurality of background areas that has the pattern present in the background area. For example, as illustrated in the upper section of FIG. 10B, when a pattern of the background area is in a vertical form, the electronic device 100 may acquire a background image by using the upper background area 1020. In this case, the electronic device 100 may acquire a background image by using the lower background area. In another example, as illustrated in the upper section of FIG. 10C, when a pattern of the background area is in a horizontal form, the electronic device 100 may acquire a background image by using the left background area 1030. In this case, the electronic device 100 may acquire a background image by using the right background area.

In another example embodiment, the electronic device 100 may acquire a background image by using the remaining background area except the background area that has a different pattern from most of the plurality of background areas. For example, when there is an outlet in the right background area, the electronic device 100 may acquire a background image by using the remaining background area except the right background area from among the plurality of background areas.

As another example, when a pattern of the background area is repeated, the electronic device 100 may copy a representative part (e.g., repeated pattern) of the background area in a tile form to acquire a background image. For example, as illustrated in FIG. 10D, when the background area has a brick pattern, the electronic device 100 may copy a pattern area for one brick from among the background area in a tile form to acquire a background image. In this case, the electronic device 100 may select a pattern area 1040 according to a user input as illustrated in FIG. 10E, but this is only an example, and the electronic device 100 may select the pattern area 1040 by analyzing a pattern of the brick pattern.

Figure 10B:
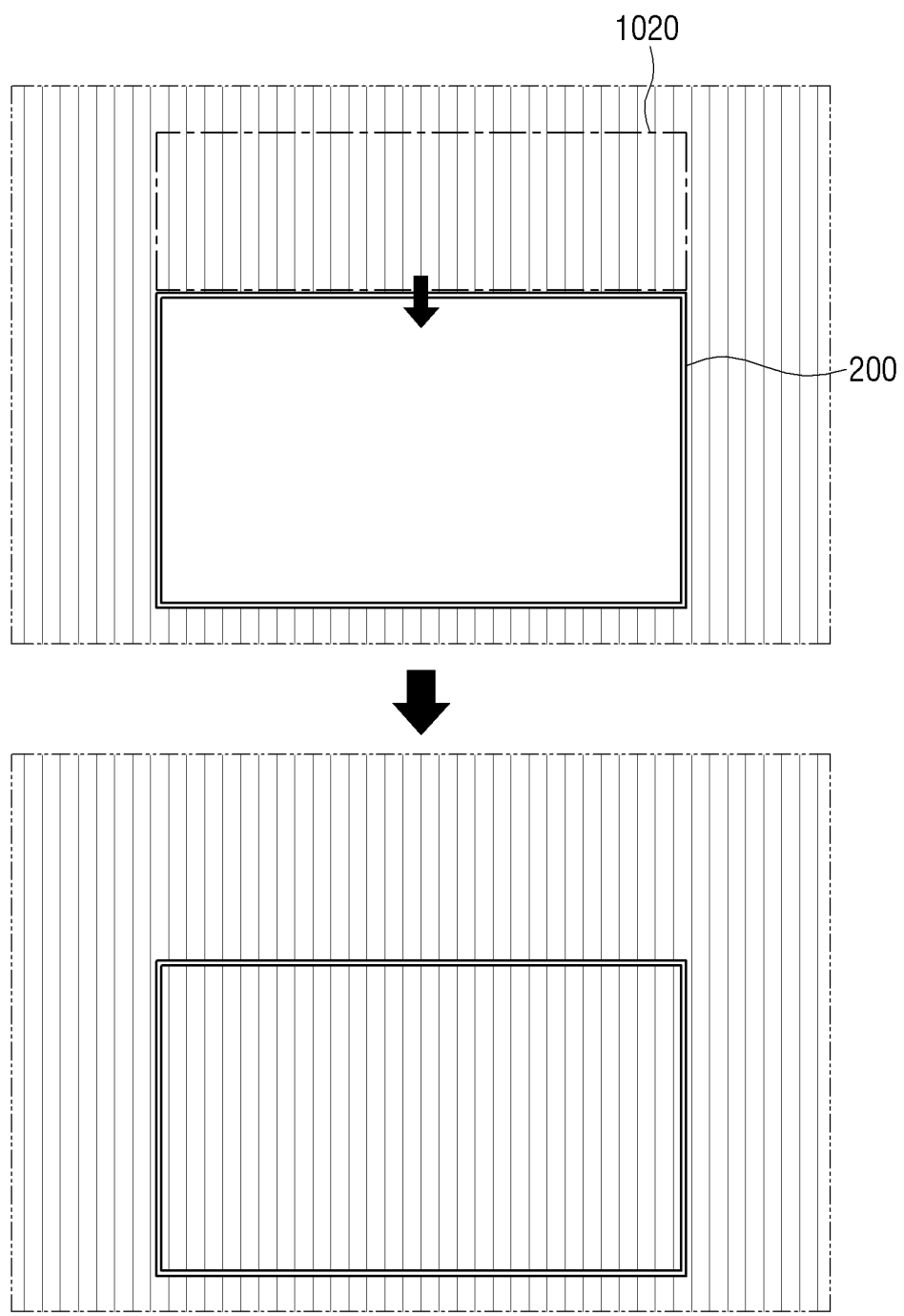
Figure 10C:
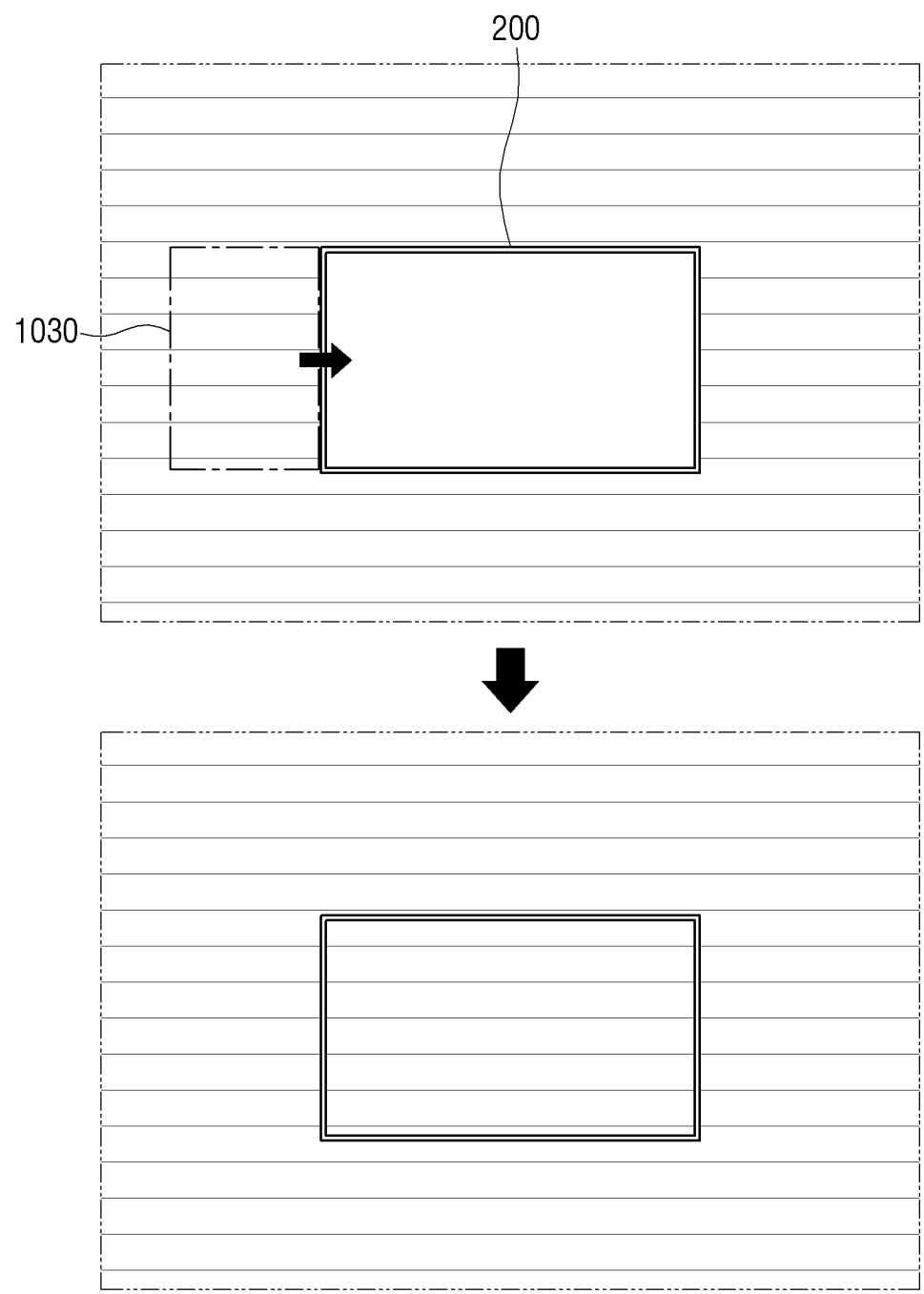
Figure 10D:
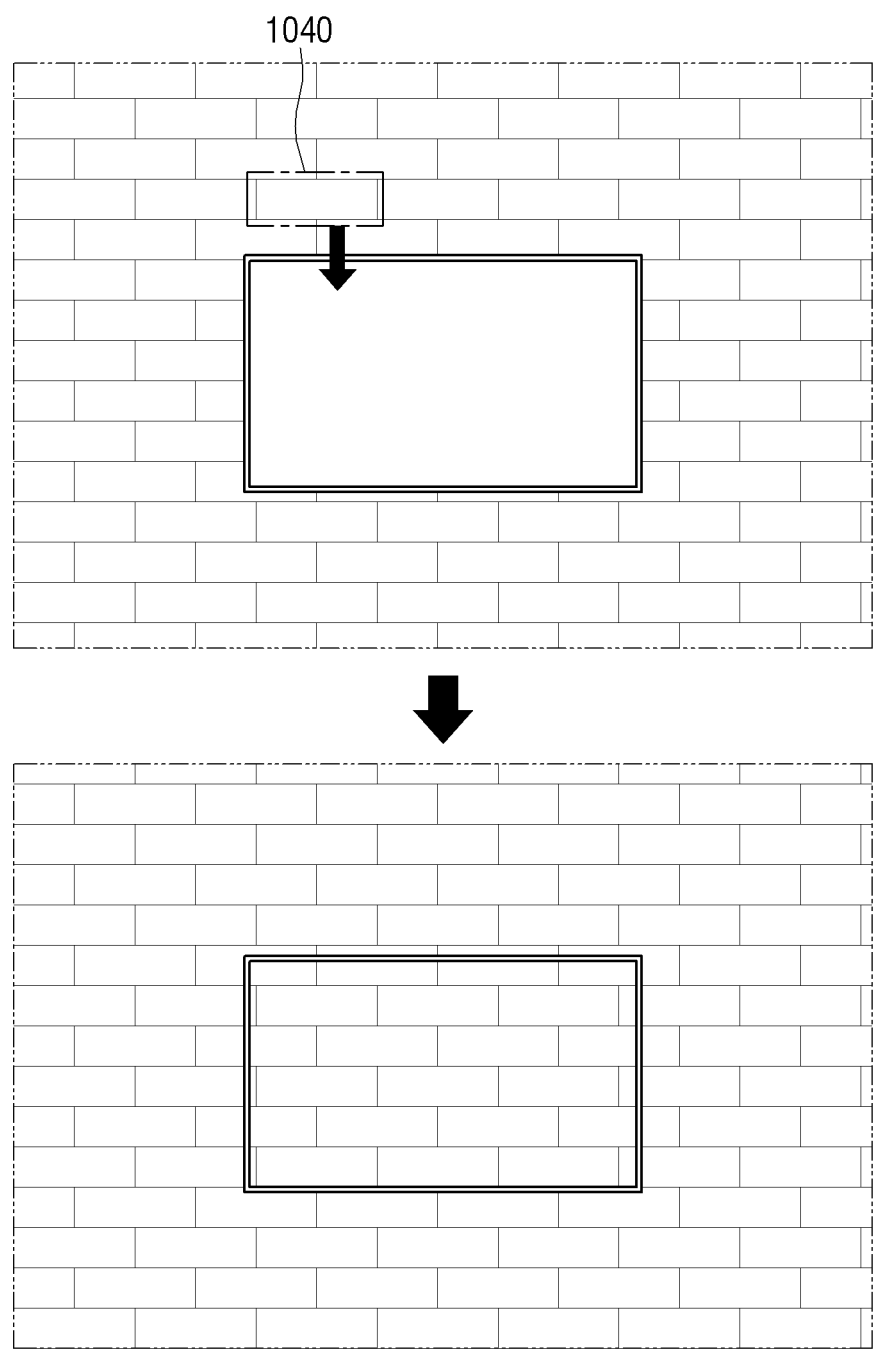
Figure 10E:
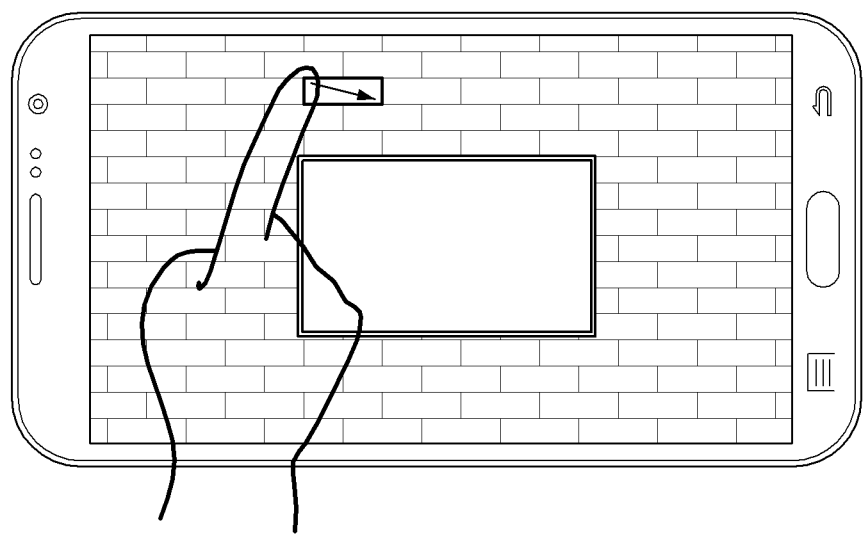
Figure 11A:
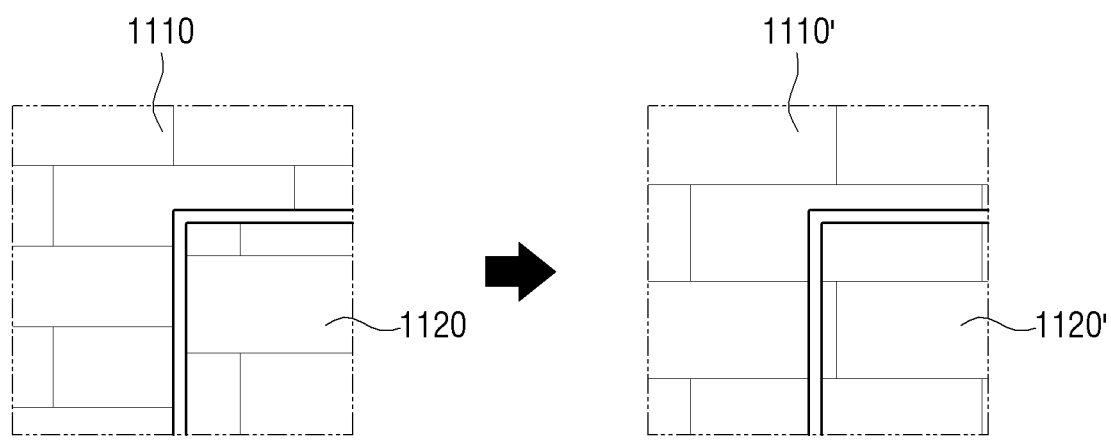
Figure 11B:
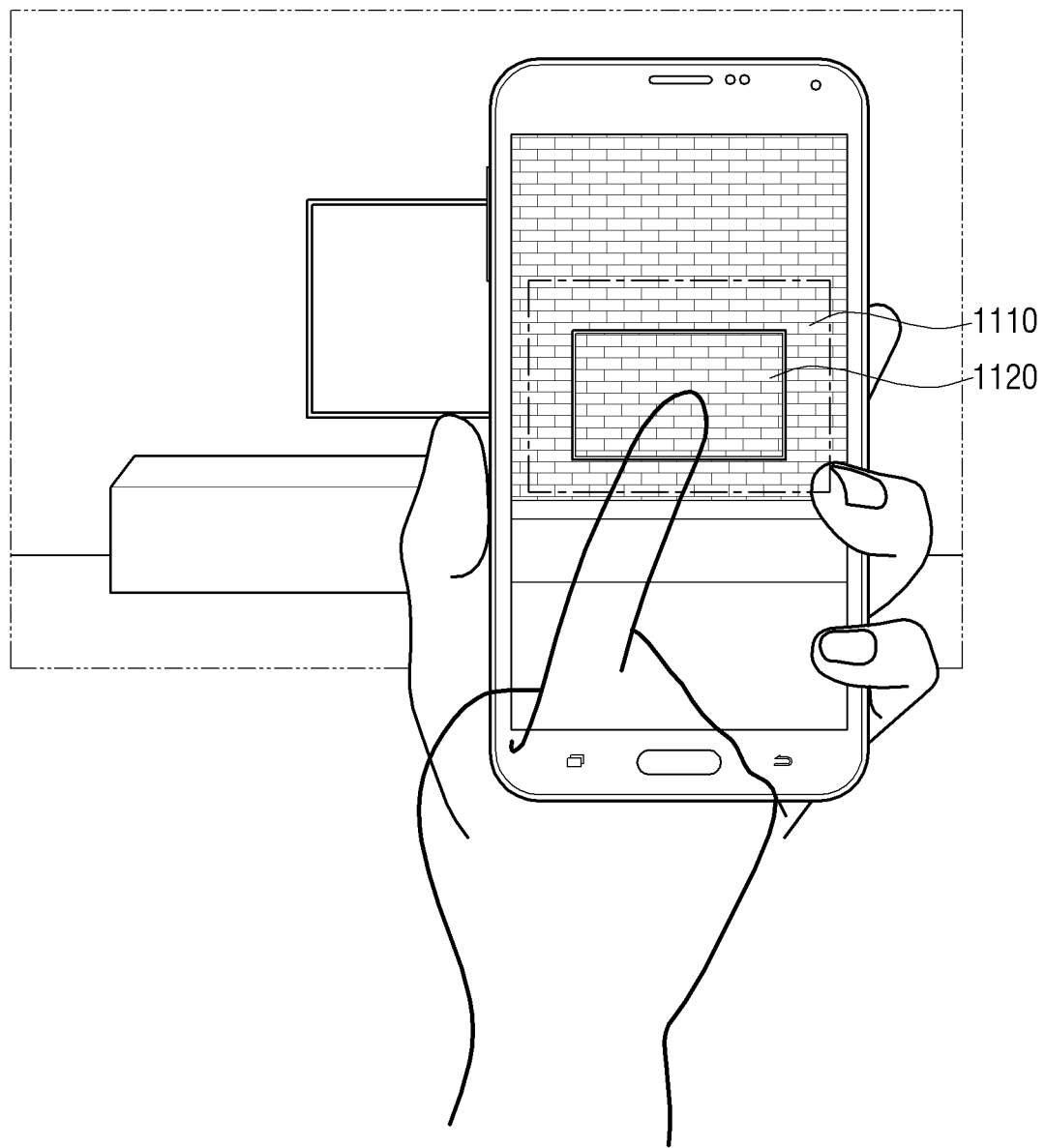

As described in FIGS. 10B, 10C, and 10D, when a background image is acquired by copying a background area that has a predetermined pattern, a phenomenon in which a pattern 1110 of the actual background area and a pattern 1120 of the background image do not coincide with each other may occur, as illustrated in FIG. 11A. In this case, the electronic device 100 may analyze the pattern 1110 of the actual background area and the pattern 1120 of the background image in order to perform correction by adjusting a size and a position of the pattern 1110 of the actual background area and the pattern 1120 of the background area which are positioned in areas adjacent to each other, as illustrated in the right section of FIG. 11A. In another example embodiment, the electronic device 100 may match the pattern 1110 of the actual background area and the pattern 1120 of the background image in response to a user input (e.g., a dragging of the pattern 1120 of the background image) as illustrated in FIG. 11B.

Figure 11C:
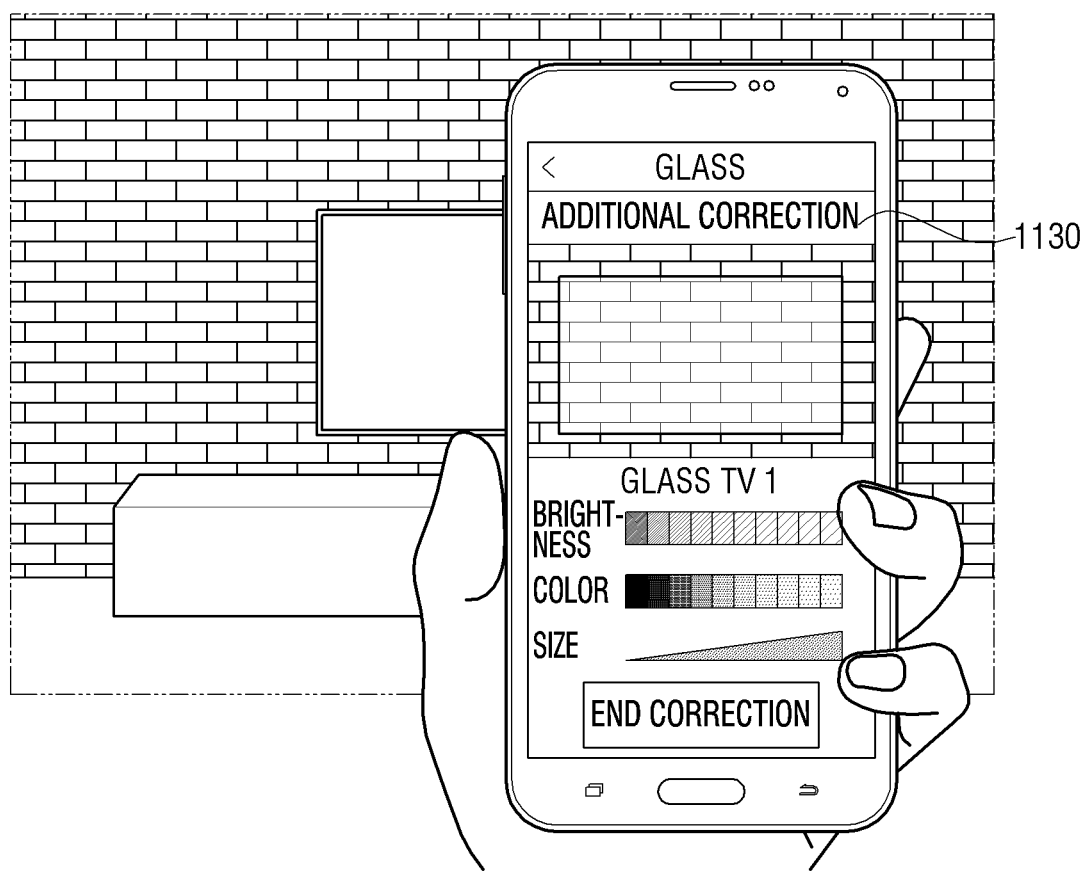

In addition, the electronic device 100 may acquire various information in order to correct the background image. In particular, the electronic device 100 may receive color temperature information of the background area sensed by the color sensor of the display apparatus 200 from the display device 200. In addition, the electronic device 100 may generate information that relates to a white balance correction of the acquired image based on the color temperature information received from the display device 200. In addition, the electronic device 100 may perform a white balance correction to an image acquired based on the color temperature information received from the display device 200 to acquire a background image to which the white balance correction is performed. In another example embodiment, the electronic device 100 may control the display 130 to display a UI 1130 which facilitates a correction of any of a brightness, a color, and a size of a background image as illustrated in FIG. 11C.

Figure 12:
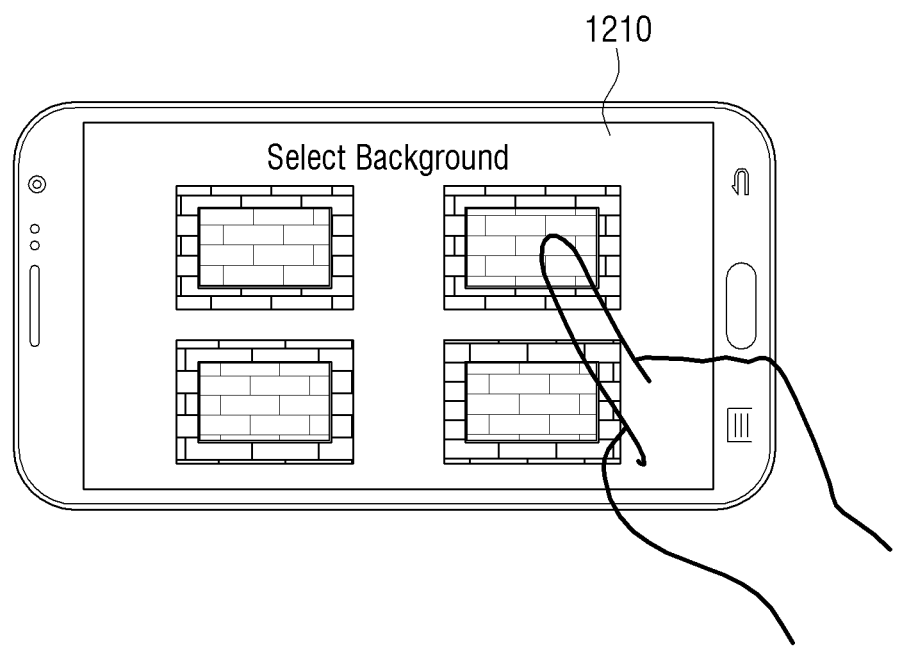

In addition, when the electronic device 100 generates a plurality of background images by using a plurality of background areas, the electronic device 100 may control the display 130 to display a UI that includes a plurality of background images as illustrated in FIG. 12. Thereby, a user can select an optimal background image from among a plurality of background images.

After a background image is acquired, the electronic device 100 may control the display 130 to display the background image on the display area before transmitting the background image to the display device 200. Thus, the user may check how the background image is displayed and acquire information that relates to the background image.

In addition, the electronic device 100 transmits the acquired information that relates to the background image to the display device 200. The information that relates to the background image may include not only the background image but also information that relates to a correction (white balance correction) of the background image.

Figure 13:
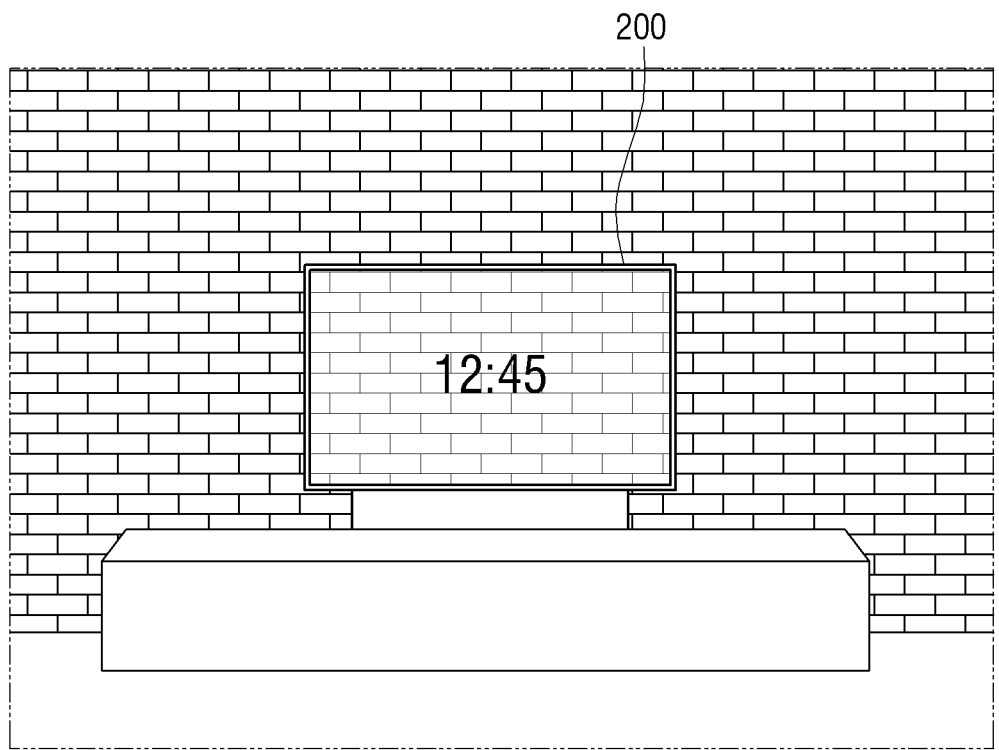

In addition, the display device 200 may acquire the received background image information and generate a background image layer. In addition, the display device 200 may display the image layer together with the background image layer as illustrated in FIG. 13, and thereby a visual effect as if information is displayed on a glass window can be provided. In this case, an image effect layer (e.g., shadow effect, etc.) may be further generated between the background image layer and the image layer.

FIG. 14 is a flowchart illustrating a method of controlling an electronic device 100 for acquiring a background image displayed by a display device, according to an example embodiment.

First, the electronic device 100 acquires an image by photographing an area in which the display device 200 is installed, at operation S1410.

In addition, the electronic device 100 may analyze the acquired image and identify a display area in which the display device 200 is disposed and a background area peripheral to the display device 200, at operation S1420. In this case, the electronic device 100 may identify a display area and a background area by using the methods described above with reference to FIGS. 7A, 7B, 8A, and 8B.

In addition, the electronic device 100 may acquire information that relates to a background image at a position in which the display device 200 is installed by using a background area among the acquired images, at operation S1430. In this case, the electronic device 100 may acquire a background image by using color information such as an RGB average value, and acquire a plurality of background images by analyzing a plurality of background areas.

Lastly, the electronic device 100 transmits the acquired information that relates to the background image to the display device 200, at operation S1440.

According to the various example embodiments described above, the background image can be acquired even after the display device is installed, so that the previously installed display device can provide the same image effect as the glass window.

The method of controlling an electronic device according to the above-described various example embodiments may be realized as a program and provided in the user terminal device. In particular, a non-transitory computer readable medium in which a program which implements a method of controlling an electronic device is stored therein may be provided.

The non-transitory computer readable medium refers to a medium that stores data semi-permanently rather than storing data for a very short time, such as a register, a cache, a memory, etc., and is readable by an apparatus. In detail, the above-described various applications or programs may be stored in the non-transitory computer readable medium, such as, for example, any of a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present teaching can be readily applied to other types of apparatuses. Also, the description of the example embodiments is intended to be illustrative, and not to limit the scope of the claims, and many alternatives, modifications, and variations will be apparent to persons having ordinary skill in the art.

What is claimed is:

1. A method for controlling an electronic device, the method comprising:
    photographing, through a camera, an area where a display device is located;
    obtaining an image including the display device and a peripheral area of the display device based on the photographing;
    identifying a first portion of the image and a second portion neighboring the first portion, the first portion corresponding to the display device and the second portion comprising a first pattern;
    obtaining a background image comprising a second pattern based on the second portion of the image;
    correcting a size and a position of the second pattern included in the background image to coincide with the first pattern based on a size and a position of the first pattern; and
    transmitting the background image having the corrected second pattern to the display device.

2. The method as claimed in claim 1, wherein the display device is configured to display a plurality of markers in a plurality of corner areas, and
    wherein the identifying comprises identifying the first portion and the second portion by using the plurality of markers included in the image, and performing an alignment correction regarding the first portion and the second portion by using the plurality of markers.

3. The method as claimed in claim 1, wherein the second portion includes a first background area that is positioned at an upper side of the second portion, a second background area that is positioned at a lower side of the second portion, a third background area that is positioned at a left side of the second portion, and a fourth background area that is positioned at a right side of the second portion,
    wherein a size of the display device is equal to a predetermined multiple of a respective size of each of the first background area, the second background area, the third background area, and the fourth background area, and
    wherein obtaining the background image comprises copying at least one from among the first background area, the second background area, the third background area, and the fourth background area by the predetermined multiple.

4. The method as claimed in claim 3, wherein obtaining the background image comprises copying a partial area of at least one from among the first background area, the second background area, the third background area, and the fourth background area in a tile form.

5. The method as claimed in claim 4, further comprising:
    displaying the background image,
    wherein the partial area is an area that is selected by a user command.

6. The method as claimed in claim 3, further comprising:
    displaying a user interface (UI) that includes a plurality of background images generated by using each of the first background area, the second background area, the third background area, and the fourth background area,
    wherein the transmitting comprises, in response to a selected background image from among the plurality of background images being selected, transmitting background image information that relates to the selected background image to the display device.

7. The method as claimed in claim 1, further comprising:
    receiving, from the display device, color temperature information regarding the second portion; and
    generating information that relates to a white balance correction of the image based on the color temperature information.

8. An electronic device comprising:
    a communication interface;
    a camera;
    a display; and
    a processor configured to:
        obtain an image including a display device and a peripheral area of the display device by photographing, through the camera, an area where the display device is located,
        identify a first portion of the image and a second portion neighboring the first portion, the first portion corresponding to the display device and the second portion comprising a first pattern, obtain a background image comprising a second pattern based on the second portion of the image, correct a size and a position of the second pattern included in the background image to coincide with the first pattern based on a size and a position of the first pattern, and transmit, through the communication interface, the background image having the corrected second pattern to the display device.

9. The electronic device as claimed in claim 8, wherein the display device is configured to display a plurality of markers in a plurality of corner areas, and wherein the processor is further configured to identify the first portion and the second portion by using the plurality of markers which is included in the image, and to perform an alignment correction regarding the first portion and the second portion by using the plurality of markers.

10. The electronic device as claimed in claim 8, wherein the second portion includes a first background area that is positioned at an upper side of the second portion, a second background area that is positioned at a lower side of the second portion, a third background area that is positioned at a left side of the second portion, and a fourth background area that is positioned at a right side of the second portion, wherein a size of the display device is equal to a predetermined multiple of a respective size of each of the first background area, the second background area, the third background area, and the fourth background area, and wherein the processor is further configured to obtain the background image by copying at least one from among the first background area, the second background area, the third background area, and the fourth background area by the predetermined multiple.

11. The electronic device as claimed in claim 10, wherein the processor is further configured to obtain the background image by copying a partial area of at least one from among the first background area, the second background area, the third background area, and the fourth background area in a tile form.

12. The electronic device as claimed in claim 11, wherein the partial area is an area that is selected by a user command.

13. The electronic device as claimed in claim 10, wherein the processor is further configured to display, through the display, a user interface (UI) that includes a plurality of background images generated by using each of the first background area, the second background area, the third background area, and the fourth background area, and in response to a selected background image from among the plurality of background images being selected, to transmit, through the communication interface, background image information that relates to the selected background image to the display device.

14. The electronic device as claimed in claim 8, wherein the processor is further configured to receive through the communication interface, from the display device, color temperature information regarding the second portion sensed by a color sensor of the display device, and to generate information that relates to a white balance correction of the image based on the color temperature information.

15. A non-transitory computer readable medium which stores a program to execute a method for controlling an electronic device, the method comprising:

photographing, through a camera, an area where a display device is located;

obtaining an image including the display device and a peripheral area of the display device based on the photographing;

identifying a first portion of the image and a second portion neighboring the first portion, the first portion corresponding to the display device and the second portion comprising a first pattern;

obtaining a background image comprising a second pattern based on the second portion of the image;

correcting a size and a position of the second pattern included in the background image to coincide with the first pattern based on a size and a position of the first pattern; and transmitting the background image having the corrected second pattern to the display device.

* * * * *